US011132336B2

(12) United States Patent
Passey et al.

(10) Patent No.: US 11,132,336 B2
(45) Date of Patent: Sep. 28, 2021

(54) FILESYSTEM HIERARCHICAL CAPACITY QUANTITY AND AGGREGATE METRICS

(71) Applicant: Qumulo, Inc., Seattle, WA (US)

(72) Inventors: Aaron Passey, Seattle, WA (US); Kevin O'Neill, Seattle, WA (US); Peter Godman, Seattle, WA (US); Iain Peet, Seattle, WA (US)

(73) Assignee: Qumulo, Inc., Seattle, WA (US)

( * ) Notice: Subject to any disclaimer, the term of this patent is extended or adjusted under 35 U.S.C. 154(b) by 12 days.

(21) Appl. No.: 14/859,114

(22) Filed: Sep. 18, 2015

(65) Prior Publication Data

US 2016/0371296 A1    Dec. 22, 2016

Related U.S. Application Data

(60) Provisional application No. 62/181,111, filed on Jun. 17, 2015.

(51) Int. Cl.
    *G06F 16/00* (2019.01)
    *G06F 16/17* (2019.01)
    *G06F 16/185* (2019.01)

(52) U.S. Cl.
    CPC ........ *G06F 16/1734* (2019.01); *G06F 16/185* (2019.01)

(58) Field of Classification Search
    CPC ......... G06F 17/30539; G06F 17/30716; G06F 17/30327; G06F 17/30489; G06F 17/30551; G06F 17/30554; G06F 17/30961; G06Q 30/0256; G06Q 10/103; G06Q 50/08
    See application file for complete search history.

(56) References Cited

U.S. PATENT DOCUMENTS

| 5,165,031 A | 11/1992 | Pruul et al. |
| 5,319,773 A | 6/1994 | Britton et al. |
| 5,410,684 A | 4/1995 | Ainsworth et al. |
| 5,410,719 A | 4/1995 | Shackleford |

(Continued)

FOREIGN PATENT DOCUMENTS

| EP | 1217551 A2 * | 6/2002 | ....... G06F 17/30589 |
| EP | 1498829 A1 * | 1/2005 | ....... G06F 17/30294 |

(Continued)

OTHER PUBLICATIONS

International Search Report and Written Opinion for counterpart International Application No. PCT/US2016/038242, dated Oct. 11, 2016 (11 pages).

(Continued)

*Primary Examiner* — Augustine K. Obisesan
(74) *Attorney, Agent, or Firm* — John W. Branch; Branch Partners PLLC

(57) ABSTRACT

A software and hardware facility persistently maintains metrics on directories at different levels within a tree of a filesystem. The facility hierarchically aggregates attributes of files contained by directories and stores them as metric values in each directory within a tree. The stored values represent summed or otherwise aggregated data from the descendant directories and files. The metric values represent aggregated attributes such as checksums, MIN and/or MAX aggregates, sameness bits, bloom filter aggregates, queryable user tags, moving average aggregates, b-tree aggregates, etc.

21 Claims, 20 Drawing Sheets

(56) References Cited

U.S. PATENT DOCUMENTS

| | | | |
|---|---|---|---|
| 5,442,561 A | 8/1995 | Yoshizawa et al. | |
| 5,953,719 A | 9/1999 | Kleewein et al. | |
| 6,236,996 B1 | 5/2001 | Bapat et al. | |
| 6,385,641 B1 | 5/2002 | Jiang et al. | |
| 6,415,283 B1* | 7/2002 | Conklin | G06F 16/9027 |
| 6,496,944 B1 | 12/2002 | Hsiao et al. | |
| 6,529,998 B1 | 3/2003 | Yochai et al. | |
| 6,772,435 B1 | 8/2004 | Thexton et al. | |
| 6,874,130 B1 | 3/2005 | Baweja et al. | |
| 6,892,211 B2 | 5/2005 | Hitz et al. | |
| 6,965,903 B1* | 11/2005 | Agarwal | G06F 17/30595 |
| 6,965,936 B1 | 11/2005 | Wipfel et al. | |
| 7,213,040 B1 | 5/2007 | Stokes et al. | |
| 7,594,138 B2 | 9/2009 | Abdulvahid | |
| 7,636,743 B2 | 12/2009 | Erofeev | |
| 7,693,876 B2 | 4/2010 | Hackworth et al. | |
| 7,757,056 B1 | 7/2010 | Fair | |
| 7,844,580 B2 | 11/2010 | Srivastava et al. | |
| 7,933,870 B1 | 4/2011 | Webster | |
| 7,937,421 B2 | 5/2011 | Mikesell et al. | |
| 7,962,709 B2 | 6/2011 | Agrawal | |
| 7,966,293 B1 | 6/2011 | Owara et al. | |
| 8,027,827 B2 | 9/2011 | Bitar et al. | |
| 8,108,429 B2 | 1/2012 | Sim-Tang et al. | |
| 8,296,312 B1* | 10/2012 | Leung | G06F 17/30109 |
| | | | 707/760 |
| 8,364,648 B1 | 1/2013 | Sim-Tang | |
| 8,423,733 B1 | 4/2013 | Ozdemir | |
| 8,448,170 B2 | 5/2013 | Wipfel et al. | |
| 8,463,825 B1 | 6/2013 | Harty et al. | |
| 8,489,656 B2 | 7/2013 | Erofeev | |
| 8,504,733 B1* | 8/2013 | Iyer | G06F 11/3048 |
| | | | 707/705 |
| 8,515,911 B1 | 8/2013 | Zhou et al. | |
| 8,612,404 B2 | 12/2013 | Bone et al. | |
| 8,612,488 B1 | 12/2013 | Subramanya et al. | |
| 8,645,323 B2 | 2/2014 | Jackiewicz et al. | |
| 8,661,447 B1 | 2/2014 | Olliff et al. | |
| 8,776,050 B2 | 7/2014 | Pouffe et al. | |
| 8,782,655 B2 | 7/2014 | Blanding et al. | |
| 8,806,154 B1 | 8/2014 | Gupta et al. | |
| 8,838,887 B1 | 9/2014 | Burke et al. | |
| 8,838,931 B1 | 9/2014 | Marshak et al. | |
| 8,849,764 B1 | 9/2014 | Long et al. | |
| 8,868,797 B1 | 10/2014 | Kirac et al. | |
| 8,924,364 B1 | 12/2014 | Zhong et al. | |
| 8,972,694 B1 | 3/2015 | Dolan et al. | |
| 9,015,214 B2 | 4/2015 | Nishida | |
| 9,026,765 B1 | 5/2015 | Marshak et al. | |
| 9,047,017 B1 | 6/2015 | Dolan et al. | |
| 9,141,633 B1 | 9/2015 | Li et al. | |
| 9,143,379 B1 | 9/2015 | Berger et al. | |
| 9,158,653 B2 | 10/2015 | Gold | |
| 9,171,145 B2 | 10/2015 | Dash et al. | |
| 9,244,975 B2 | 1/2016 | Das et al. | |
| 9,244,976 B1 | 1/2016 | Zhang et al. | |
| 9,384,252 B2 | 7/2016 | Akirav et al. | |
| 9,501,487 B1 | 11/2016 | Yuan et al. | |
| 9,547,560 B1 | 1/2017 | Lee | |
| 9,600,193 B2 | 3/2017 | Ahrens et al. | |
| 9,747,171 B2 | 8/2017 | Beeken et al. | |
| 9,753,782 B2 | 9/2017 | Fang et al. | |
| 9,753,932 B1 | 9/2017 | Brow et al. | |
| 9,785,377 B2 | 10/2017 | Shin et al. | |
| 10,140,185 B1 | 11/2018 | Lopez et al. | |
| 10,261,868 B2 | 4/2019 | Brown et al. | |
| 10,275,493 B1 | 4/2019 | Mostak | |
| 10,303,561 B2 | 5/2019 | Beeken et al. | |
| 10,318,401 B2 | 6/2019 | Rothschild et al. | |
| 10,339,101 B1 | 7/2019 | Gupta | |
| 10,423,609 B1 | 9/2019 | Strauss | |
| 10,437,509 B1 | 10/2019 | Alexeev et al. | |
| 10,474,635 B1 | 11/2019 | Unger et al. | |
| 10,534,758 B1 | 1/2020 | Carpenter et al. | |
| 2001/0039622 A1 | 11/2001 | Hitz et al. | |
| 2002/0065835 A1 | 5/2002 | Fujisaki | |
| 2002/0083073 A1* | 6/2002 | Vaidya | G06F 17/30589 |
| 2002/0099691 A1* | 7/2002 | Lore | G06F 17/30324 |
| 2002/0173271 A1 | 11/2002 | Graham et al. | |
| 2003/0033308 A1 | 2/2003 | Patel et al. | |
| 2003/0145009 A1* | 7/2003 | Forman | G06N 99/005 |
| 2003/0177379 A1 | 9/2003 | Hori et al. | |
| 2003/0182313 A1 | 9/2003 | Federwisch et al. | |
| 2004/0098425 A1 | 5/2004 | Wiss et al. | |
| 2004/0153479 A1 | 8/2004 | Mikesell et al. | |
| 2004/0255048 A1 | 12/2004 | Lev Ran et al. | |
| 2005/0015674 A1 | 1/2005 | Haugh | |
| 2005/0027748 A1 | 2/2005 | Kisley | |
| 2005/0065986 A1 | 3/2005 | Bixby et al. | |
| 2005/0091663 A1 | 4/2005 | Bagsby | |
| 2005/0114593 A1 | 5/2005 | Ouchi | |
| 2005/0119996 A1 | 6/2005 | Ohata et al. | |
| 2005/0154666 A1 | 7/2005 | Steely, Jr. et al. | |
| 2005/0195660 A1 | 9/2005 | Kavuri et al. | |
| 2005/0223019 A1 | 10/2005 | Das et al. | |
| 2006/0004890 A1 | 1/2006 | Semple et al. | |
| 2006/0053139 A1 | 3/2006 | Marzinski et al. | |
| 2006/0089982 A1 | 4/2006 | Abbott et al. | |
| 2006/0123005 A1 | 6/2006 | Burnett et al. | |
| 2006/0172366 A1 | 8/2006 | Groger | |
| 2006/0173842 A1* | 8/2006 | Horvitz | G06F 16/10 |
| 2006/0271604 A1 | 11/2006 | Shoens | |
| 2007/0011302 A1 | 1/2007 | Groner | |
| 2007/0027985 A1 | 2/2007 | Ramany et al. | |
| 2007/0100855 A1 | 5/2007 | Kohl | |
| 2007/0118561 A1 | 5/2007 | Idicula et al. | |
| 2007/0143371 A1 | 6/2007 | Kottomtharayil | |
| 2008/0028006 A1* | 1/2008 | Liu | G06F 16/273 |
| 2008/0059399 A1 | 3/2008 | DeLorme et al. | |
| 2008/0059541 A1 | 3/2008 | Fachan et al. | |
| 2008/0082593 A1 | 4/2008 | Komarov et al. | |
| 2008/0228772 A1 | 9/2008 | Plamondon | |
| 2008/0250357 A1* | 10/2008 | Lee | G06F 17/2211 |
| | | | 715/853 |
| 2008/0256474 A1 | 10/2008 | Chakra et al. | |
| 2008/0270469 A1* | 10/2008 | Myerson | G06F 11/3409 |
| 2008/0270928 A1 | 10/2008 | Chakra et al. | |
| 2008/0282244 A1 | 11/2008 | Wu et al. | |
| 2008/0288306 A1 | 11/2008 | MacIntyre et al. | |
| 2008/0301256 A1 | 12/2008 | McWilliams et al. | |
| 2008/0313217 A1 | 12/2008 | Dunsmore et al. | |
| 2009/0077087 A1 | 3/2009 | Urano et al. | |
| 2009/0138500 A1* | 5/2009 | Yuan | G06F 16/289 |
| 2009/0199190 A1 | 8/2009 | Chen et al. | |
| 2009/0222509 A1 | 9/2009 | King et al. | |
| 2009/0274047 A1 | 11/2009 | Kruys et al. | |
| 2009/0319566 A1* | 12/2009 | Wald | G06F 17/30958 |
| 2010/0036895 A1 | 2/2010 | Boyd et al. | |
| 2010/0088317 A1 | 4/2010 | Bone et al. | |
| 2010/0161557 A1 | 6/2010 | Anderson et al. | |
| 2010/0179959 A1 | 7/2010 | Shoens | |
| 2010/0217948 A1 | 8/2010 | Mason | |
| 2010/0241668 A1 | 9/2010 | Susanto et al. | |
| 2010/0281214 A1 | 11/2010 | Jernigan, IV | |
| 2010/0287512 A1* | 11/2010 | Gan | G06F 16/26 |
| | | | 715/854 |
| 2011/0039622 A1 | 2/2011 | Levenson | |
| 2011/0066668 A1 | 3/2011 | Guarraci | |
| 2011/0082836 A1 | 4/2011 | Wang et al. | |
| 2011/0125799 A1 | 5/2011 | Kandasamy et al. | |
| 2011/0125973 A1 | 5/2011 | Lev et al. | |
| 2011/0161381 A1 | 6/2011 | Wang et al. | |
| 2011/0161964 A1 | 6/2011 | Piazza et al. | |
| 2011/0196833 A1 | 8/2011 | Drobychev et al. | |
| 2011/0196899 A1 | 8/2011 | Hughes et al. | |
| 2011/0202925 A1 | 8/2011 | Banerjee et al. | |
| 2011/0246724 A1 | 10/2011 | Marathe et al. | |
| 2012/0036463 A1* | 2/2012 | Krakovsky | G06Q 10/06 |
| | | | 715/771 |
| 2012/0136843 A1 | 5/2012 | Bone et al. | |
| 2012/0151438 A1 | 6/2012 | Bach et al. | |
| 2012/0166478 A1* | 6/2012 | Das | G06F 16/2453 |
| | | | 707/769 |
| 2012/0204060 A1 | 8/2012 | Swift et al. | |

(56) References Cited

U.S. PATENT DOCUMENTS

| | | |
|---|---|---|
| 2012/0317079 A1 | 12/2012 | Shoens et al. |
| 2013/0019072 A1 | 1/2013 | Strasser et al. |
| 2013/0073819 A1 | 3/2013 | Havewala et al. |
| 2013/0086121 A1 | 4/2013 | Presian |
| 2013/0091168 A1* | 4/2013 | Bhave ................ G06F 16/2477 707/771 |
| 2013/0110787 A1 | 5/2013 | Garimella et al. |
| 2013/0191355 A1 | 7/2013 | Bone et al. |
| 2013/0304903 A1 | 11/2013 | Mick et al. |
| 2013/0311454 A1 | 11/2013 | Ezzat |
| 2013/0318194 A1 | 11/2013 | Timbs |
| 2013/0339406 A1 | 12/2013 | Kanfi |
| 2014/0006354 A1 | 1/2014 | Parkinson et al. |
| 2014/0040199 A1 | 2/2014 | Golab et al. |
| 2014/0040693 A1 | 2/2014 | Kim et al. |
| 2014/0095249 A1 | 4/2014 | Tarakad et al. |
| 2014/0101389 A1 | 4/2014 | Nellans et al. |
| 2014/0156956 A1 | 6/2014 | Ezra |
| 2014/0181441 A1 | 6/2014 | Kottomtharayil et al. |
| 2014/0258609 A1 | 9/2014 | Cui et al. |
| 2014/0280485 A1 | 9/2014 | A Hummaida et al. |
| 2014/0281307 A1 | 9/2014 | Peterson et al. |
| 2014/0281411 A1 | 9/2014 | Abdallah |
| 2014/0344222 A1 | 11/2014 | Morris et al. |
| 2014/0372384 A1 | 12/2014 | Long et al. |
| 2014/0372607 A1 | 12/2014 | Gladwin et al. |
| 2014/0373032 A1 | 12/2014 | Merry et al. |
| 2015/0006226 A1 | 1/2015 | Smith et al. |
| 2015/0067086 A1 | 3/2015 | Adriaens et al. |
| 2015/0067142 A1* | 3/2015 | Renkema ............ G06F 11/3409 709/224 |
| 2015/0106145 A1 | 4/2015 | Hamilton et al. |
| 2015/0135331 A1 | 5/2015 | Das |
| 2015/0186529 A1* | 7/2015 | Rope ..................... G06Q 10/00 707/722 |
| 2015/0193347 A1 | 7/2015 | Kluesing et al. |
| 2015/0215405 A1 | 7/2015 | Baek et al. |
| 2015/0242263 A1 | 8/2015 | Klose |
| 2015/0278282 A1 | 10/2015 | Sardina et al. |
| 2015/0310035 A1 | 10/2015 | Godman et al. |
| 2015/0347126 A1* | 12/2015 | Tibble ....................... G06F 8/70 717/132 |
| 2016/0034356 A1 | 2/2016 | Aron et al. |
| 2016/0139836 A1 | 5/2016 | Nallathambi et al. |
| 2016/0224430 A1 | 8/2016 | Long et al. |
| 2016/0246816 A1 | 8/2016 | Abiri et al. |
| 2016/0292013 A1 | 10/2016 | Li et al. |
| 2016/0306610 A1 | 10/2016 | Ni et al. |
| 2016/0314046 A1 | 10/2016 | Kumarasamy |
| 2016/0335278 A1 | 11/2016 | Tabaaloute et al. |
| 2016/0357677 A1 | 12/2016 | Hooker et al. |
| 2016/0359859 A1 | 12/2016 | Capone |
| 2016/0371297 A1 | 12/2016 | Okun et al. |
| 2016/0380878 A1 | 12/2016 | Bugenhagen et al. |
| 2017/0032006 A1 | 2/2017 | Anglin et al. |
| 2017/0046143 A1 | 2/2017 | Kochhar et al. |
| 2017/0078164 A1 | 3/2017 | Hildebrand et al. |
| 2017/0091046 A1 | 3/2017 | Bangalore et al. |
| 2017/0123883 A1 | 5/2017 | Hall |
| 2017/0123935 A1 | 5/2017 | Pandit et al. |
| 2017/0163728 A1 | 6/2017 | Chawla et al. |
| 2017/0201582 A1 | 7/2017 | Zhang et al. |
| 2017/0206231 A1 | 7/2017 | Binder et al. |
| 2017/0286455 A1 | 10/2017 | Li et al. |
| 2017/0316321 A1 | 11/2017 | Whitney et al. |
| 2017/0344598 A1 | 11/2017 | Constantinescu et al. |
| 2017/0344905 A1 | 11/2017 | Hack et al. |
| 2018/0040029 A1 | 2/2018 | Zeng et al. |
| 2018/0101546 A1 | 4/2018 | Krasnow et al. |
| 2018/0288057 A1 | 10/2018 | Varadamma et al. |
| 2018/0314423 A1 | 11/2018 | Gong et al. |
| 2019/0095112 A1 | 3/2019 | Lingarajappa |
| 2019/0102700 A1 | 4/2019 | Babu et al. |
| 2019/0163591 A1 | 5/2019 | Ouyang et al. |
| 2020/0004977 A1 | 1/2020 | Araujo et al. |

FOREIGN PATENT DOCUMENTS

| | | | |
|---|---|---|---|
| WO | 1999044145 A1 | 9/1999 | |
| WO | 0072201 A1 | 11/2000 | |
| WO | WO-0072201 A1 * | 11/2000 | ............. G06Q 10/06 |
| WO | 2009007250 | 1/2009 | |

OTHER PUBLICATIONS

Comer, Douglas, "The Ubiquitous B-Tree," Computing Surveys, vol. 11, No. 2, Jun. 1979. Computer Science Department, Purdue University, West Lafayette, Indiana 47907.

Bloom, Burton H., "Space/Time Trade-offs in Hash Coding with Allowable Errors," Communications of the ACM, vol. 13, No. 7, Jul. 1970. Computer Usage Company, Newton Upper Falls, Massachusettes.

Office Communication for U.S. Appl. No. 14/595,598 dated Dec. 15, 2017, pp. 1-18.

Office Communication for U.S. Appl. No. 14/658,015 dated Jan. 4, 2018, pp. 1-28.

Office Communication for U.S. Appl. No. 14/595,043 dated May 4, 2017, pp. 1-30.

Office Communication for U.S. Appl. No. 14/595,043 dated May 25, 2018, pp. 1-5.

Office Communication for U.S. Appl. No. 14/595,043 dated Feb. 23, 2018, pp. 1-16.

Office Communication for U.S. Appl. No. 14/595,598 dated Feb. 24, 2017, pp. 1-8.

Office Communication for U.S. Appl. No. 14/658,015 dated Apr. 27, 2017, pp. 1-7.

Office Communication for U.S. Appl. No. 14/595,598 dated Apr. 19, 2018, pp. 1-3.

Office Communication for U.S. Appl. No. 15/957,809 dated Jun. 28, 2018, pp. 1-33.

Office Communication for U.S. Appl. No. 14/595,043 dated Oct. 5, 2018, pp. 1-17.

Office Communication for U.S. Appl. No. 14/658,015 dated Jul. 13, 2018, pp. 1-14.

Office Communication for U.S. Appl. No. 14/595,598 dated Sep. 20, 2018, pp. 1-18.

International Search Report and Written Opinion for Application No. PCT/US2016038242 dated Oct. 11, 2016, pp. 1-11.

Office Communication for U.S. Appl. No. 15/957,809 dated Jan. 24, 2019, pp. 1-28.

Office Communication for U.S. Appl. No. 14/595,043 dated Aug. 27, 2019, pp. 1-34.

Office Communication for U.S. Appl. No. 14/595,598 dated Jul. 31, 2019, pp. 1-5.

Office Communication for U.S. Appl. No. 16/434,157 dated Jul. 25, 2019, pp. 1-16.

Office Communication for U.S. Appl. No. 16/152,277 dated Oct. 16, 2020, pp. 1-10.

Office Communication for U.S. Appl. No. 16/152,615 dated Oct. 20, 2020, pp. 1-7.

Office Communication for U.S. Appl. No. 16/775,041 dated Nov. 3, 2020, pp. 1-5.

Office Communication for U.S. Appl. No. 17/062,500 dated Nov. 12, 2020, pp. 1-12.

Office Communication for U.S. Appl. No. 16/226,587 dated Aug. 5, 2019, pp. 1-54.

Office Communication for U.S. Appl. No. 16/228,716 dated Jun. 24, 2019, pp. 1-28.

Office Communication for U.S. Appl. No. 16/231,354 dated Jul. 10, 2019, pp. 1-16.

Office Communication for U.S. Appl. No. 16/262,756 dated Aug. 5, 2019, pp. 1-48.

Office Communication for U.S. Appl. No. 15/967,499 dated Jun. 27, 2018, pp. 1-25.

Office Communication for U.S. Appl. No. 16/226,587 dated Feb. 25, 2019, pp. 1-65.

Office Communication for U.S. Appl. No. 16/228,716 dated Feb. 28, 2019, pp. 1-28.

(56) References Cited

OTHER PUBLICATIONS

Office Communication for U.S. Appl. No. 16/231,354 dated Mar. 25, 2019, pp. 1-19.
Office Communication for U.S. Appl. No. 16/262,756 dated Apr. 2, 2019, pp. 1-40.
Office Communication for U.S. Appl. No. 16/262,790 dated Aug. 23, 2019, pp. 1-20.
Office Communication for U.S. Appl. No. 16/262,790 dated Apr. 18, 2019, pp. 1-24.
Office Communication for U.S. Appl. No. 16/262,756 dated Oct. 25, 2019, pp. 1-6.
Office Communication for U.S. Appl. No. 16/659,488 dated Dec. 30, 2019, pp. 1-35.
Office Communication for U.S. Appl. No. 14/595,598 dated Dec. 31, 2019, pp. 1-23.
Office Communication for U.S. Appl. No. 16/004,208 dated Aug. 27, 2018, pp. 1-11.
Office Communication for U.S. Appl. No. 16/234,395 dated Aug. 8, 2019, pp. 1-28.
Office Communication for U.S. Appl. No. 16/234,334 dated Apr. 5, 2019, pp. 1-24.
Office Communication for U.S. Appl. No. 16/234,395 dated Mar. 28, 2019, pp. 1-36.
Kappes et al. "Dike: Virtualization-aware Access Control for Multitenant Filesystems", Feb. 18, 2013, pp. 1-6.
Hitz et al. "Merging NT and UNIX filesystem Permissions", Proceedings of the 2nd USENIX Windows NT Symposium, Seattle, Washington, Aug. 3-4, 1998, pp. 1-10.
Office Communication for U.S. Appl. No. 16/234,334 dated Oct. 11, 2019, pp. 1-22.
Office Communication for U.S. Appl. No. 15/473,051 dated Jun. 30, 2017, pp. 1-22.
Extended European Search Report for European Patent Application No. 18155779.4 dated Apr. 17, 2018, pp. 1-15.
Office Communication for U.S. Appl. No. 16/004,182 dated Aug. 23, 2018, pp. 1-46.
Office Communication for U.S. Appl. No. 16/004,182 dated Mar. 5, 2019, pp. 1-46.
Office Communication for U.S. Appl. No. 16/004,182 dated Jul. 3, 2019, pp. 1-50.
Office Communication for U.S. Appl. No. 15/694,604 dated Jun. 3, 2019, pp. 1-14.
Office Communication for U.S. Appl. No. 16/004,182 dated May 22, 2019, pp. 1-6.
Office Communication for U.S. Appl. No. 14/859,061 dated Sep. 22, 2017, pp. 1-29.
Office Communication for U.S. Appl. No. 15/831,236 dated Mar. 30, 2018, pp. 1-8.
Office Communication for U.S. Appl. No. 15/831,236 dated Aug. 15, 2018, pp. 1-27.
Office Communication for U.S. Appl. No. 15/288,853 dated Sep. 19, 2018, pp. 1-27.
Chimera, "Value Bars: An Information Visualization and Navigation Tool for Multi-attribute Listings", CHI '92, Monterey, CA, May 3-7, 1992, pp. 293-294.
Office Communication for U.S. Appl. No. 15/288,853 dated Mar. 25, 2019, pp. 1-25.
Cudre-Mauroux, et al., "TrajStore: An Adaptive Storage System for Very Large Trajectory Sets", ICIDE 2010, Long Beach, CA, Mar. 1-6, 2010, pp. 109-120.
Office Communication for U.S. Appl. No. 16/436,825 dated Jul. 11, 2019, pp. 1-22.
Office Communication for U.S. Appl. No. 15/474,047 dated Jun. 11, 2018, pp. 1-7.
Office Communication for U.S. Appl. No. 15/854,447 dated May 6, 2019, pp. 1-31.
Office Communication for U.S. Appl. No. 16/505,562 dated Aug. 30, 2019, pp. 1-46.
Extended European Search Report for European Patent Application No. 17206518.7 dated Apr. 5, 2018, pp. 1-8.
Karatza et al, "Epoch load sharing in a network of workstations," Simulation Symposium, 2001. Proceedings. 34th Annual Apr. 22-26, 2001; Piscataway, NJ, USA, IEEE, Apr. 22, 2001 (Apr. 22, 2001), pp. 36-42, XP010541274, ISBN: 978-0-7695-1092-7.
Office Communication for U.S. Appl. No. 16/004,182 dated Jan. 7, 2020, pp. 1-54.
Office Communication for U.S. Appl. No. 16/125,573 dated Nov. 21, 2019, pp. 1-24.
Office Communication for U.S. Appl. No. 16/226,587 dated Oct. 24, 2019, pp. 1-6.
Office Communication for U.S. Appl. No. 16/262,790 dated Dec. 12, 2019, pp. 1-23.
Office Communication for U.S. Appl. No. 16/234,334 dated Jan. 16, 2020, pp. 1-8.
Office Communication for U.S. Appl. No. 15/694,604 dated Nov. 20, 2019, pp. 1-24.
Office Communication for U.S. Appl. No. 16/262,756 dated Jan. 28, 2020, pp. 1-27.
Office Communication for U.S. Appl. No. 16/434,157 dated Jan. 29, 2020, pp. 1-12.
Office Communication for U.S. Appl. No. 16/262,790 dated Feb. 6, 2020, pp. 1-8.
Office Communication for U.S. Appl. No. 16/752,451 dated Mar. 12, 2020, pp. 1-14.
Office Communication for U.S. Appl. No. 16/775,041 dated Mar. 11, 2020, pp. 1-8.
Office Communication for U.S. Appl. No. 16/779,362 dated Mar. 26, 2020, pp. 1-10.
Wikipedia clustered file system page from date Jul. 9, 2019, retrieved using the WayBackMachine, From https://web.archive.org/web/20190709083400/https://en.wikipedia.org/wiki/Clustered_file_system (Year: 2019), pp. 1-6.
Wkipedia raft page from date Jul. 16, 2019, retrieved using the WayBackMachine, from https://web.archive.org/web/20190716115001/https://en.wikipedia.org/wiki/Raft (computer_science) (Year: 2019), pp. 1-4.
Office Communication for U.S. Appl. No. 16/004,182 dated Mar. 23, 2020, pp. 1-6.
Office Communication for U.S. Appl. No. 16/752,509 dated Apr. 2, 2020, pp. 1-42.
Office Communication for U.S. Appl. No. 16/152,277 dated Apr. 3, 2020, pp. 1-10.
Office Communication for U.S. Appl. No. 16/004,182 dated Apr. 28, 2020, pp. 1-52.
Office Communication for U.S. Appl. No. 16/152,259 dated Apr. 29, 2020, pp. 1-19.
Office Communication for U.S. Appl. No. 16/262,756 dated Jun. 8, 2020, pp. 1-43.
Office Communication for U.S. Appl. No. 14/595,598 dated Jul. 9, 2020, pp. 1-26.
Office Communication for U.S. Appl. No. 16/752,451 dated Jul. 23, 2020, pp. 1-31.
Office Communication for U.S. Appl. No. 16/152,615 dated Aug. 6, 2020, pp. 1-18.
Office Communication for U.S. Appl. No. 16/779,362 dated Aug. 7, 2020, pp. 1-33.
Office Communication for U.S. Appl. No. 16/883,922 dated Aug. 7, 2020, pp. 1-18.
Office Communication for U.S. Appl. No. 16/775,041 dated Aug. 18, 2020, pp. 1-17.
Office Communication for U.S. Appl. No. 16/883,879 dated Sep. 1, 2020, pp. 1-18.
Extended European Search Report for European Patent Application No. 16812585.4 dated Nov. 7, 2018, pp. 1-9.
Office Communication for European Patent Application No. 16812585.4 dated Jan. 2, 2020, pp. 1-6.
Office Communication for U.S. Appl. No. 16/262,756 dated Aug. 24, 2020, pp. 1-21.
Office Communication for European Patent Application No. 18155779.4 dated Oct. 8, 2019, pp. 1-4.
Office Communication for U.S. Appl. No. 16/152,259 dated Aug. 28, 2020, pp. 1-5.

(56) References Cited

OTHER PUBLICATIONS

Office Communication for U.S. Appl. No. 16/752,509 dated Aug. 11, 2020, pp. 1-7.
Office Communication for U.S. Appl. No. 14/595,598 datled Sep. 25, 2020, pp. 1-7.
Office Communication for U.S. Appl. No. 16/004,208 dated Aug. 27, 2019, pp. 1-11.
Extended European Search Report for European Patent Application No. 16/004,182 dated Apr. 5, 2018, pp. 1-8.
Office Communication for U.S. Appl. No. 14/595,598 dated Sep. 25, 2020, pp. 1-7.
Office Communication for U.S. Appl. No. 16/004,182 dated Nov. 30, 2020, pp. 1-55.
Office Communication for U.S. Appl. No. 16/883,922 dated Dec. 2, 2020, pp. 1-9.
Office Communication for U.S. Appl. No. 16/883,879 dated Dec. 8, 2020, pp. 1-5.
Office Communication for U.S. Appl. No. 16/152,277 dated Dec. 28, 2020, pp. 1-5
Office Communication for U.S. Appl. No. 16/004,182 dated Jan. 23, 2021, pp. 1-4.
Office Communication for U.S. Appl. No. 14/595,598 dated Feb. 4, 2021, pp. 1-19.
Office Communication for U.S. Appl. No. 17/115,529 dated Feb. 8, 2021, pp. 1-15.
Office Communication for U.S. Appl. No. 16/262,756 dated Feb. 10, 2021, pp. 1-19.
Office Communication for U.S. Appl. No. 17/114,384 dated Feb. 17, 2021, pp. 1-12.
Examination Report for European Patent Application No. 17206518.7 dated Feb. 23, 2021, pp. 1-6.
Office Communication for U.S. Appl. No. 16/004,182 dated Mar. 8, 2021, pp. 1-60.
Office Communication for U.S. Appl. No. 17/062,500 dated Mar. 9, 2021, pp. 1-17.
Office Communication for U.S. Appl. No. 16/152,277 dated Mar. 18, 2021, pp. 1-10.
Office Communication for U.S. Appl. No. 17/160,698 dated Mar. 18, 2021, pp. 1-11.

\* cited by examiner

| file | mtime | access permissions |
|---|---|---|
| /USR/file1 | 2010-01-19T06:53:59Z | 0775 |
| /USR/file2 | 2009-08-30T22:23:01Z | 0744 |
| /USR/USER1/file1 | 2014-05-10T23:12:59Z | 0755 |
| /USR/USER1/file2 | 2010-11-13T03:23:39Z | 0755 |
| /USR/USER1/music/file1 | 2012-02-29T16:21:11Z | 0755 |
| /USR/USER1/music/file2 | 2010-05-09T06:20:10Z | 0755 |
| /USR/USER1/photos/file1 | 2011-02-12T12:22:12Z | 0755 |
| /USR/USER1/photos/file2 | 2011-09-10T18:20:13Z | 0755 |
| /USR/USER2/file1 | 2014-05-11T23:12:59Z | 0744 |

| file | filesize (KB) | time-weighted size |
|---|---|---|
| /USR/file1 | 1 | 0 |
| /USR/file2 | 32 | 0 |
| /USR/USER1/file1 | 30 | 7.5 |
| /USR/USER1/file2 | 43,534 | 0 |
| /USR/USER1/music/file1 | 2,345 | 0 |
| /USR/USER1/music/file2 | 435 | 0 |
| /USR/USER1/photos/file1 | 546 | 0 |
| /USR/USER1/photos/file2 | 4 | 0 |
| /USR/USER2/file1 | 234,545 | 234,545 |

FIG. 14 music-a — 1402

Dashboard | Analytics ▾ | Sharing ▾ | Cluster ▾

Qumulo QEFS | Signed in as admin
Friday, September 26, 2014
11:54 AM
America/Los Angeles

Integrated Analytics

In view: /

Name — 1404
/ — 1406

Size Used Overall
277.5 GB 99.7% 5.69%

Permissions — 1408
0777

Created — 1412
09/15/2014
2:31 PM

Last Modified — 1410
09/26/2014
11:02 AM — 1414

Directories Files — 1416
8288 56877

Top IOPS Activity 84.32  /user/john/company_remote/src/Im_not_quite_the_fastest
15.53  /music/bob/BIG_FILE_2
10.08  /music/zed/mp3/musician1/music_for_airports/musician1-music_for_airports-01-1_1.mp3.pvdrxZ
7.85   /music/bob/ALAC/musician2/album1/07 - song.m4a
5.13   /music/bob/ALAC/musician2/album1/06 - song.m4a
4.55   /music/bob/ALAC/musician2/album1/05 - song.m4a IOPS: Namespace ☑Reads ☑Writes File ☑Reads ☑Writes — 1422
                  1420

| 1426 music | zed | mp3 | [More] |
| | john | shared music library | TV Shows / Compilations [More] |
| | jane | Music | Compilations [More] |
| [More] | bob 1430 | BIG_FILE_2 / ALAC / BIG_FILE | [More] |
| | [More] 1428 | | |

FIG. 15C

FILESYSTEM HIERARCHICAL CAPACITY QUANTITY AND AGGREGATE METRICS

CROSS-REFERENCE TO RELATED APPLICATION(S)

This application claims the benefit of U.S. Provisional Application No. 62/181,111 entitled "FILESYSTEM HIERARCHICAL CAPACITY QUANTITY AND AGGREGATE METRICS," filed on Jun. 17, 2015, which is hereby incorporated by reference in its entirety. This application is related to U.S. Provisional Application No. 61/982,926 entitled DATA STORAGE SYSTEM" and 61/982,931 entitled "DATA STORAGE SYSTEM," both filed on Apr. 23, 2014, U.S. Non-Provisional application Ser. No. 14/595,043, filed on Jan. 12, 2015 and entitled "FILESYSTEM HIERARCHICAL AGGREGATE METRICS," U.S. Non-Provisional application Ser. No. 14/595,598 entitled "FAIR SAMPLING IN A HIERARCHICAL FILESYSTEM," filed on Jan. 13, 2015, and U.S. Non-Provisional application Ser. No. 14/658,015 entitled "DATA MOBILITY, ACCESSIBILITY, AND CONSISTENCY IN A DATA STORAGE SYSTEM," filed on Mar. 13, 2015, each of which is hereby incorporated by reference in its entirety. In cases where the present application and a document incorporated herein by reference conflict, the present application controls.

TECHNICAL FIELD

The described technology is directed to the field of filesystems.

BACKGROUND

The demand for scalable storage resources and the ability to provide rapid access to content stored thereby is a key concern to end-users. Enterprises, businesses, and individuals alike now use large scale filesystems to store data that is remotely accessible via a network. Such filesystems are often accessible via closed (e.g., enterprise) and open (e.g., Internet) networks and allow concurrent access via multiple client devices. Various implementations of large scale filesystems relying on network access have been developed. The primary differences between such filesystems are (1) that they use different protocols for the client devices and servers to communicate to read and write data and (2) that the data and corresponding metadata are stored in different ways.

For some filesystems, the protocol provides access to end-users by implementing APIs through a network, while others are specific to operating systems. Some such operating systems include default programs which may be called to synchronously determine and display filesystem information to an end-user. For example, UNIX includes a .du program which return file space usage of a directory.

Users benefit from knowing the amount of storage resources as well as the allocation of those resources to various portions of the filesystem, such as directories, subdirectories, and files in a filesystem hierarchy, in order to facilitate management of the filesystem. For example, administrators can allocate system resources to frequently accessed nodes and can determine if additional storage capacity is required.

Systems administrators find useful various kinds of filesystem queries. For example, one system administrator may wish to generate a list of all files created in the past hour.

BRIEF DESCRIPTION OF THE DRAWINGS

FIG. 14 is a display diagram showing an interactive GUI provided by the facility that indicates metric values for directories of a filesystem hierarchy.

FIGS. 15A-15C are display diagrams showing different directory levels selectable through an interactive GUI provided by the facility that indicate metric values for directories of a filesystem hierarchy.

DETAILED DESCRIPTION

Figure 1:
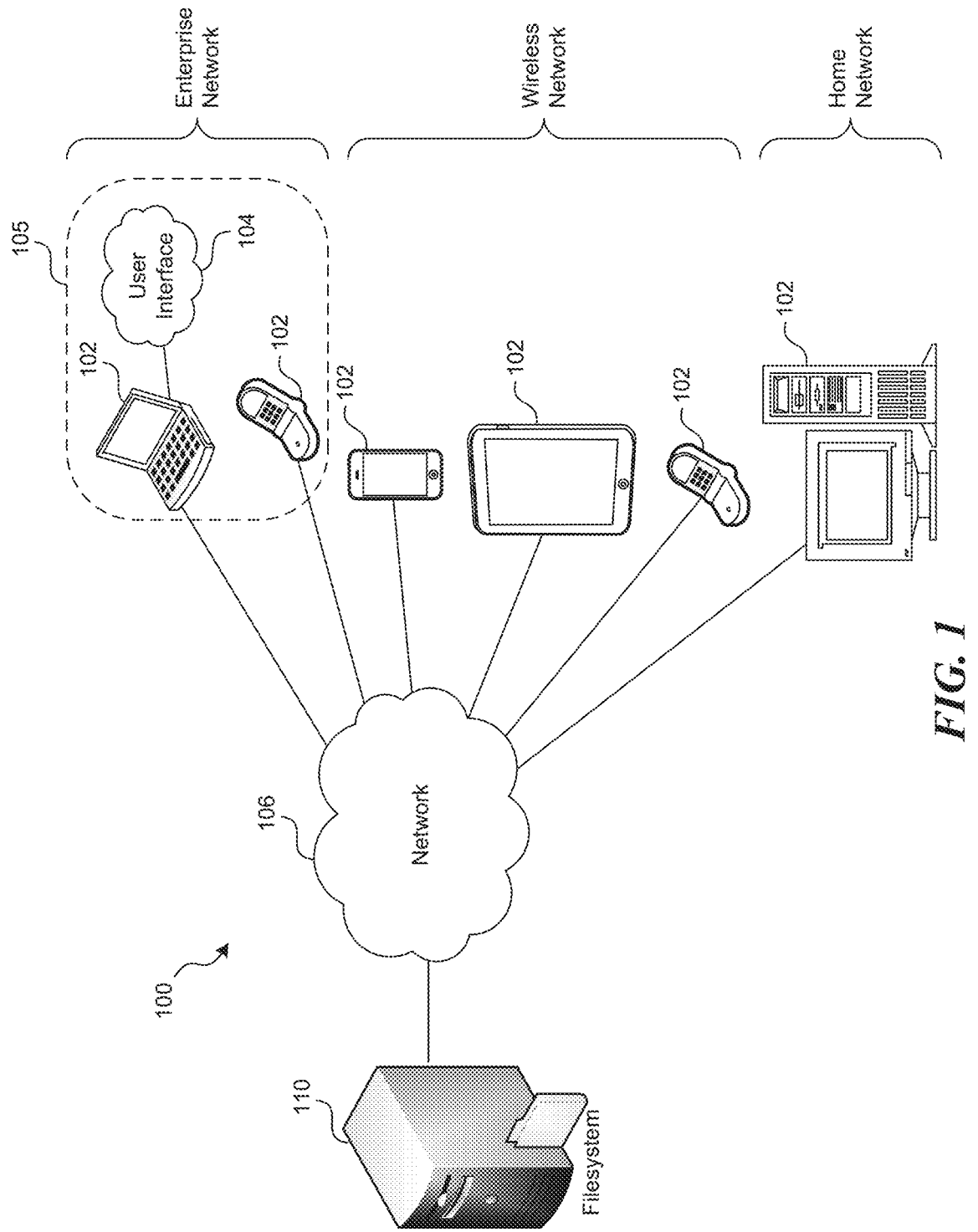
FIG. 1 shows an environment in which the facility operates.

The inventors have recognized that conventional filesystems incur significant latency in aggregating metadata attributes of files to obtain hierarchical aggregate metric values ("metric values") that provide a user with visibility into the filesystem. Traditionally, in tree-structured filesystems, in order to satisfy a request for metrics for a subtree of the filesystem, it has been necessary to systemically and recursively traverse an entire subtree in response to the request. The tree-structured filesystems discussed herein comprise a hierarchical tree of filesystem objects—directories and files—that include a root directory. Each filesystem object contains inode data that includes filesystem administration information. The filesystem object may be directly accessed by the filesystem via filesystem path or address, and the data contained in the inode data may be used by the filesystem to manage the hierarchy.

For example, if a user wants to know how much storage capacity is available in a particular user space, such as in a subtree of the filesystem hierarchy contained by a directory, a conventional filesystem must synchronously aggregate a file size metadata attribute value for each file in each filesystem object in the subtree to return the aggregated value to the user. In another example, if the user wants to know how much storage is dedicated to .crw files in the filesystem, conventional filesystems must synchronously check each file's type and aggregate the size of each that is a .crw file. Not only is does this create an imbalance in system performance, but it imposes a high cost in terms of number of I/O operations. More importantly, it may take hours to return the requested value to the user, depending on the size of the filesystem and its hardware components.

In addition, for conventional filesystems in which numerous users concurrently access the files, the returned values may fail to reflect any modifications to data that occur during the slow scan. Using the prior example, a second user may access the system and delete 2 TB (terabytes) of .crw files in a particular directory. However, if the scan accesses the directory containing those files prior to the deletion and returns the result subsequent to the deletion, that result is inaccurate and will fail to reflect the modified data.

To avoid latency, performance fluctuations, increased I/O costs, and other issues, the inventors have determined that it is desirable to maintain for each directory in a filesystem tree, persistent hierarchical aggregates or "metric values" for file attributes of the filesystem objects contained by the subtree defined by that directory. Accordingly, a request for such metrics for a particular subtree can be satisfied without exhaustively traversing each level of the subtree of the filesystem tree structure in response.

A software and hardware facility described herein ("the facility") addresses these issues by persistently maintaining metrics on directories at different levels within a filesystem tree. The facility may operate with respect to a distributed or monolithic filesystem, such as one maintained by a number of networked nodes in a cluster. In particular, in some embodiments, the facility aggregates attributes of filesystem objects using, for example, a deterministic function, and stores them as metric values in each directory within a tree. In some embodiments, the values stored in a directory represent data summed or otherwise aggregated from filesystem objects contained by an entire subtree of filesystem objects—directories and files—defined by that directory. In some embodiments, the metric values may represent such measures as total space consumed by a filesystem object and all the descendant objects, total number of files within an filesystem object, total data blocks used by a filesystem object and its descendant filesystem objects (if any), etc.

In some embodiments, the metrics stored in a directory containing no other directories is determined by performing an aggregation or other logical operation on attributes of the files contained by the directory. In some embodiments, the metrics stored in other directories are each determined by performing an aggregation or other logical operation on the attributes of the files contained by the directory itself, further aggregated with the corresponding metrics of the child directories. For example, metric values may provide: a most recently accessed filesystem object including all its descendant objects, a most frequently accessed filesystem object in a tree or subtree, a largest filesystem object in set of objects in a tree or subtree, and the like.

In some embodiments, the facility provides additional aggregates or metric values, such as checksum aggregates, MIN and/or MAX aggregates, sameness bits, bloom filter aggregates, queryable user tags, moving average aggregates, b-tree aggregates, and so on. Checksum aggregates represent a checksum of all files stored in a particular folder and its subfolders. A MIN aggregate for a folder represents, for a given attribute, the minimum value of that attribute for all files and folders in the folder and its subfolders, such as the minimum filesize or last modified time. A MAX aggregate for a folder represents, for a given attribute, the maximum value of that attribute for all files and folders in the folder and its subfolders, such as the maximum number of users that have accessed a file or creation time. A sameness bit for an attribute represents whether all files in a folder have the same value for the given attribute and can be aggregated for a folder by AND-ing the corresponding sameness bit of each of subfolder of the folder. A bloom filter aggregate for a folder can be used to determine whether the folder or its subfolders may or does not contain a file with a particular attribute value. A queryable user tag allows a user to create custom attributes or metadata for files that can then be indexed, aggregated, and so on. A moving average aggregate provides an estimate of diskspace usage for a given period. Furthermore these aggregates or metric values may be applied to a variety of hierarchical structures, such as a b-tree, b+ tree, b*-tree, binary tree, and so on. In some examples aggregates are stored as separate, additional data values within blocks or nodes of a hierarchical structure, while in other examples the aggregates are stored within other data structures, such as standard keys of a b-tree. In this manner, the facility is able to scale the implementation of aggregations to filesystems that have very large directories.

By performing in some or all of the ways described above, the facility enables rapid access to metric values based on file attributes and aggregates stored at various levels in the filesystem. Because the metric values for those attributes are maintained in each directory and are updated frequently, the facility typically does not need to traverse significant portions of the filesystem tree in order to determine corresponding metric value.

FIG. 1 illustrates an environment 100 in which the facility may operate. For example, a filesystem may communicate over a network 106, such as the Internet, with computing systems, e.g., clients 102, through a secondary network. In particular, the user executes a browser program on a client in order to display the contents of a user interface which may be used to generate and execute requests to access the facility, e.g., filesystem 110. In some embodiments, a secondary network may include an enterprise network, wireless network, or home network on which the client is operating. A variety of proxy servers or gateway devices may be additionally included in the communication path between the facility 110 and the client 102, though not specifically shown in the illustrated environment. In various embodiments, a variety of computing systems or other devices may be used as client computer systems, such as mobile phones, personal digital assistants, tablet computers, etc.

In various embodiments, the facility includes computer systems and devices including zero or more of each of the following: a central processing unit ("CPU") for executing computer programs; a computer memory for storing programs and data while they are being used, including the facility and associated data, an operating system including a kernel, and device drivers; a persistent storage device, such as a hard drive or flash drive for persistently storing programs and data; a computer-readable media drive, such as a floppy, CD-ROM, or DVD drive, for reading programs and data stored on a computer-readable medium; and a network connection for connecting the computer system to other computer systems to send and/or receive data, such as via the Internet or another network and its networking hardware, such as switches, routers, repeaters, electrical cables and optical fibers, light emitters and receivers, radio transmitters and receivers, and the like.

While computer systems configured as described above are typically used to support the operation of the facility, those skilled in the art will appreciate that the facility may be implemented using devices of various types and configurations, and having various components. Furthermore, while various embodiments are described in terms of the environment described above, those skilled in the art will appreciate that the facility may be implemented in a variety of other environments including a single, monolithic computer system, as well as various other combinations of computer systems or similar devices connected in various ways.

Figure 2:
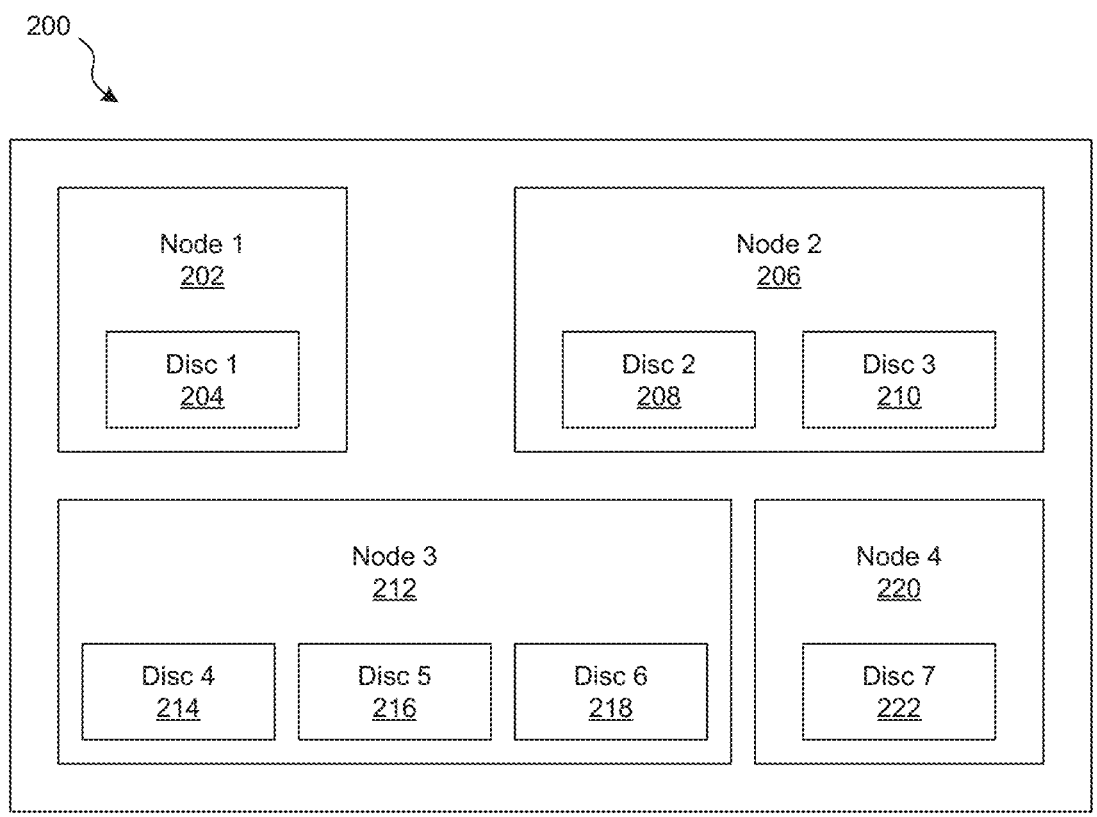
FIG. 2 is a block diagram illustrating a cluster of storage devices operated by the facility.

FIG. 2 is a block diagram of cluster 200 in a distributed filesystem in which numerous storage devices may be networked together for use in connection with the facility. One or more storage devices additionally may be coupled together in groups, forming nodes (e.g., Node 1 202, Node 2 206, Node 3 212, Node 4 220) within the facility. Each node within the cluster 300 has a particular address, or path name accessible via the network filesystem protocol, an instance of which is included on each node. Accordingly, each node in the cluster 200 typically includes one or more computer processors or controllers and data storage devices such as hard disks, solid state disk drives, or similar computer readable storage or memory devices. For example, a node may include one or more server computers themselves, contained by such components. Each of the data storage devices (e.g., disc1 204, disc2 208, etc.) within a node may store data in blocks, the stored data corresponding to files contained by filesystem object data of the hierarchical tree structures implemented by the facility.

Figure 3:
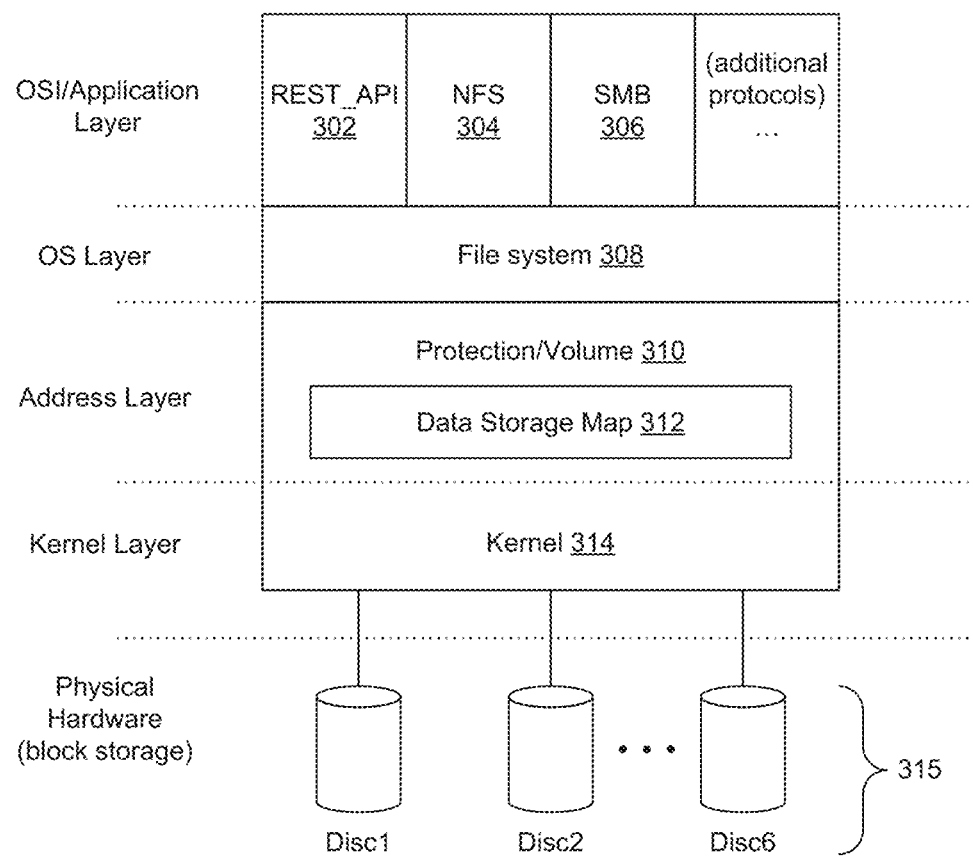
FIG. 3 is an abstraction level diagram of the facility.

FIG. 3 illustrates abstraction layers provided by the facility in some embodiments. For example, the layers can include an application layer, an operating system layer (OS) that includes a host (local) filesystem, an address abstraction layer that includes a protection/volume 310 (e.g., a protected storage unit) referenced by the local filesystem 308 and a kernel layer that translates requests from the OS layer and an address provided by the address layer.

The application layer of the facility exposes an instance of a web application programming interface (API) 302 (e.g., REST), a network filesystem protocol 304 (NFS), and an application layer network protocol 306 (e.g., SMB). The NFS protocol 304 is an application level protocol used to access the facility over a network, such as the Internet. The application layer network protocol 306 may be used to communicate with other nodes in the facility, accessible by the NFS 304. In some embodiments, the application layer includes protocols such as http, ftp, scp, rsync, afp, afs, or a variety of other application layer protocols capable of providing network-level access to the facility. Any of the aforementioned protocols are considered reasonable variations to the illustrated protocols and may be used in addition to or in place of those protocols.

An OS layer implements a core filesystem 308. To access stored data, the core filesystem 308 references a location (e.g., in a protected storage unit) which is used by the address abstraction layer to retrieve the requested data. Accordingly, the address abstraction layer can include a data storage map 312 that links the referenced location to a particular node and associated disc (e.g., see FIG. 2) on which the requested data is stored.

The facility also includes the kernel layer that translates the filesystem call (for the requested data) into instructions for hardware components. The hardware components may be located in a hardware layer and may include a plurality of storage devices 315 (e.g., disc1, disc2, disc3) that can be distributed across multiple storage nodes.

In some embodiments, the facility manages metric requests for filesystem objects through the web API 302. These requests are stateless in order to account for various platforms on which filesystem may be implemented. Accordingly, calls made from a client device, such as devices 102 in FIG. 1, can request a metric value to be retrieved for one or more filesystem objects stored by the facility. Exemplary metric value requests in some embodiments are provided in the following table:

| | |
|---|---|
| capacity_usage | total blocks used for file data (not metadata) |
| moving_capacity_usage | moving sum of capacity_usage (exponentially decayed, 60 minute lifetime) |
| num_directories | total directory count under the filesystem object |
| num_files | total file count under the filesystem object |
| num_input_operations | total number of write operations on files |
| moving_input_operations | moving sum of num_input_operations (exponentially decayed, 60 minute lifetime) |

Each of the metric requests within the table typically returns a value indicating an aggregate value of attributes for a collection of files contained by a directory within the facility. In some embodiments, the metric requests return integer values for aggregated attributes of a file in the facility. The capacity usage and the moving capacity usage may be in units of bytes and, in some embodiments, include 4096-byte data blocks. Some of the metrics maintained by the facility are aggregations on filesystem object attributes of types other than integer. For example, in some embodiments, the facility maintains a recent access ("raccess") time metric based on applying a latest( ) aggregation function to an access time ("atime") attribute maintained for each descendant filesystem object. In some embodiments, the metrics are checksums. In various embodiments, the facility maintains other aggregates based on, combinations of when filesystem objects were last accessed, changed, modified, created, archived, transferred, deleted, revived, or based on filesize (e.g., minimum and/or maximum filesizes).

In some embodiments, the facility maintains a checksum aggregate for folders within a subtree. The checksum aggregate generated by calculating, for each folder, a checksum (e.g., XOR, cyclic redundancy check, longitudinal parity check) and/or hash (e.g., SHA-256, MD5) of all of the files and subfolders within that folder. One of ordinary skill in the art will recognize that a variety of checksum functions/ algorithms and/or hash functions are used to generate a checksum and corresponding checksum aggregates. For example, in some embodiments the facility uses SHA-256 to generate hash values for individual files within a folder and XOR the generated hash values for individual files and the checksum aggregates for each subfolder to generate a checksum aggregate for the folder. The checksum aggregates enable a computing system to quickly compare contents of a directory tree by comparing the checksum aggregates rather than comparing each individual file or folder. In this manner, the facility improves the rate at which a computing system performs various actions, such as bi-directional replication, de-duplication, and the freeing of file cache space. For example, a process for de-duplicating files and folders uses the checksum aggregates to determine whether two or more folders contain (or are likely to contain) identical files rather than separately scanning each folder. As another example, a replication system (such as a cloud backup storage system), the checksum aggregates allow for quicker identification of changes between a folder and a previously-stored version (i.e., snapshot) of that folder or between two or more snapshots. If the checksum aggregate for a current version of a folder and the aggregate checksum for a previously-stored version of the folder are the same, then the two versions are likely to be the same. If, however, the checksum aggregate for the current version of a folder and the checksum aggregate for the previously-stored version of the folder are not the same, then the two versions are not the same. In this case, the facility compares checksum aggregates for each subfolder and file within each version of the folder to identify where the changes have occurred. In some embodiments, the computing system checks subfolders before files if, for example, the ratio of files to folders greater than a predetermined threshold (e.g., 500 to 1 or 100 to 1). In other embodiments, the computing system checks the files before subfolders. In some embodiments, if a difference is found, the new version is backed up and the computing system recalculates the aggregate checksum(s) (i.e., the aggregate checksum for the folder storing the changed file and the aggregate checksum for each of its parent folders) to determine whether there are additional differences. Thus, the checksum aggregates improve the rate at which a computing system compares folders and different versions of those folders to, for example, quickly identify changes between a folder and a snapshot of that folder.

In some embodiments, the facility enables the use of a "sameness bit" aggregate for one or more attributes or metadata. A sameness bit specifies whether every object within a folder (and all of its subfolders) has the same value for a particular attribute or metadata element. For example, if all of the files within a folder and its subfolders have the same access permissions (e.g., read, write, and execute for an owner class and read-only for all other classes), then a "permissions sameness bit" aggregate is set to 1 for that folder (and all of its subfolders). If, however, one or more of the files becomes writeable by a class other than the user class, then the facility updates the "permissions sameness bit" aggregate to 0 for the folder that contains it, and any ancestor folders up to the nearest ancestor for which the bit is 0. As another example, if all of the files within a folder and its subfolders have the same owner, then the facility sets an "owner sameness bit" aggregate to 1. A sameness bit aggregate improves the rate at which a computing system identifies files and folders, such as those relevant to a particular query. For example, if a user is searching for all writeable files, then the computing system skips or eliminates searching any folder (and its subfolders) having a "read-only sameness bit" set to 1 (i.e., all of the files in the folder (and its subfolders) are either read-only or not read-only) and containing a file that is not writeable. Similarly, if a user is searching for all files owned by "USER1" and a folder with an "owner sameness bit" set to 1 is found to contain a file owned by "USER2," then the rest of the contents of that folder (and all of its subfolders) are skipped. In some embodiments, the facility maintains a sameness aggregate that is larger than a bit, such as a byte, word, string, and so on. For example, if an owner sameness string is set to "Alice" for a particular folder and a user is searching for all files owned by another user, then the computing system skips that folder. In this manner, the sameness attributes enable improved search times by enabling a search process to quickly identify folders (and corresponding files and subfolders) that to be skipped during a search or other process.

In some embodiments, the facility maintains a bloom filter aggregate for one or more attributes. A bloom filter is a probabilistic data structure used to determine whether a particular element is likely to belong to a particular set. While a bloom filter can produce false positives, it does not produce false negatives. For example, a bloom filter can be used to determine whether a particular folder may contain any files having a particular attribute, such as a particular owner, creator, mtime, and so on. If a user is searching for all files owned by USER1, a computing system can apply a bloom filter configured to determine whether a particular folder may contain or does not contain any files owned by any particular user. In some embodiments, a bloom filter is represented as a bit string and generated by applying multiple hash functions to an attribute value for a particular file or folder, each hash function generating a placement in the bit string, and setting corresponding bits in the bit string to 1. For example, after adding 3 files to a folder an "owner bloom filter aggregate" for that folder (i.e., a bloom filter that represents the owners of the files in that folder) is represented by the following bit string:

0010 1000 0110 0100

When another file is added to the folder, the owner attribute for that file is submitted to the multiple hash functions and a new bit string (e.g., a bit string initialized to zero) is generated for that file with the corresponding bits set to one, resulting in the following new bit string:

0000 1010 0101 0000

The facility uses this bit string to update the bloom filter aggregate by OR-ing the bit string generated for the new file with the current owner bloom filter aggregate, resulting in the following bit string:

0010 1010 0111 0100

This bit string is OR-ed with each of the "owner bloom filter aggregates" in the ancestor folders to update their corresponding "owner bloom filter aggregates." In response to a query for a particular owner or owners, the facility applies the same hash functions to the owner or owners to produce a query bit string. If all of the corresponding bits in the bloom filter aggregate are equal to 1 (i.e., if the result of AND-ing the query bit string with the "owner bloom filter aggregate" is the query bit string), then there is a chance that the folder (or one of its subfolders) includes a file owned by the particular owner or owners. Otherwise, neither the folder nor its subfolders includes a file owned by the particular owner or owners and, therefore, these folders are skipped as part of the search. Additional information regarding Bloom filters can be found in Bloom, Burton H. "Space/Time Trade-Offs in Hash Coding with Allowable Errors," *Communications of the ACM* 13, pp. 422-426 (1970), which is incorporated herein by reference in its entirety.

In some embodiments, the facility employs queryable user tags to allow users to define their own attributes or metadata for files and folders and, therefore, define a custom set of files and/or folders. A user may define a user tag that leverages information maintained by the computing system or operating system. For example, a user may define a "larger than 5 MB" tag that, if set to 1, specifies that the file is larger than 5 MB, and a "created after Mar. 1, 2013" tag that, if set to 1, specifies that the file was created after Mar. 1, 2013. A user may define a tag that using information that is not otherwise available to the computing system or operating system, such as all files that a particular user has expressed an interest (e.g., "files liked by Bob"). For each file, the facility applies these user-generated tags by, for example, appending the tags to the file or a metadata field of the file, and then aggregates these values into an aggregate tag for each folder by, for example, OR-ing all of the tags for each file and subfolder within that folder. Thus, if the user is searching for files greater than 5 MB, the "larger than 5 MB" tag aggregate can be used to determine whether a particular folder contains one or more such files. In this manner, the facility improves the speed and efficiency with which a computing system identifies files relevant to a query, such as a user-generated search. Moreover, in some embodiments, the queryable user tags are indexed to further reduce the amount of time and memory required to identify files that satisfy a query. In some embodiments these user-defined tags are added to individual files or folders as metadata. In some embodiments, the facility maintains query tags that are larger than a bit.

In some embodiments, the facility maintains a moving average aggregate for a folder that signifies changes in diskspace usage over time. For example, in some embodiments the moving average aggregate is used to approximate how much data has been written to or removed from a particular folder during the previous hour, day, week, and so on. The moving average aggregate allows a user to determine how quickly diskspace usage is changing and where those changes are occurring or have occurred. The facility maintains a moving average aggregate for a folder by storing, for each file, the time at which the file was stored in that folder and then applying a decay function (e.g., an exponential decay function) to the size of the file based on when the moving average aggregate is being calculated.

In some embodiments, the facility maintains aggregate values within b-trees. A b-tree is a tree data structure commonly used in databases and filesystems to organize and store information. A b-tree provides techniques for searching, inserting, deleting, and otherwise accessing information stored within a filesystem. Additional information regarding b-trees can be found in Corner, Douglas, "The Ubiquitous B-Tree," Computing Surveys 11 (2), pp. 123-137 (June 1979), which is incorporated herein by reference in its entirety. As with filesystem subtrees and directories, the facility maintains aggregate values for b-trees by storing, in each non-leaf node aggregate values generated from that non-leaf node's children. In some embodiments, the facility uses a btree to structure the data for one or more nodes within a filesystem tree, wherein a leaf can represent a file, symlink, block device, character device, unix domain socket, named pipe, etc.

In some embodiments, certain aggregates are invertible while other aggregates are non-invertible. An invertible aggregate is one that can be updated without re-scanning the folder (and its subfolders) to update the aggregate for the folder and/or the aggregates of its ancestor folders. For example, an aggregate checksum generated using the XOR operator can be updated when a file is removed (or added) by XOR-ing the aggregate checksum with the checksum for the file. In contrast, non-invertible aggregates, such as min/max aggregates, bloom filter aggregates, sameness bits, user tags, and so on are updated by scanning the contents of a corresponding node or directory (and its subdirectories). For example, when the largest file in a directory is deleted, then the facility must search for another file (or aggregate value of a subfolder) to update a MAX filesize aggregate.

When a metric request from a client is received for data stored by the facility, the request is eventually received at a node within the cluster. For example, the request may be received through a REST_API 302 on a REST server (not shown), which is interfaced with the local filesystem 308. The facility retrieves the requested data, such as a metric value, from a particular disc 315 on a node, provided at the address (312) reference by the filesystem 308, and then returns the requested data to the client. In some embodiments, individual metric values for a single filesystem object may be returned. When a request is received for a directory having child directories, all metric values for the entire subtree defined by the directory are returned in response to a single request from a client in some embodiments. The client can parse the values in the response message in order to identify and display a specific metric value for a particular filesystem object to the user. In various embodiments, the response message is formatted in JavaScript Object Notation (JSON), extensible markup language (XML), or other data exchange language.

In some embodiments, the initial request call (e.g., GET, PUT, POST, DELETE) from a client may include a plurality of parameters for the value of the metrics in the response. For example, in one parameter the client is able to indicate a maximum number of "directory entries" to return for a filesystem object. The directory entries may include metric values for the directory and any descendant directories or files, such as those within a subtree defined by the directory. The returned values may include aggregate values for the directory as well as any descendant directories. In another parameter, the client is able to provide an order to sort the returned directory entries for the directory. The order may be based on a retrieved metric value determined by aggregating an attribute of one or more files contained by the directory and any descendant directories. For example, the client may select to sort the returned directory entries based on the storage capacity used (e.g., the number of blocks in the facility) by that filesystem object and descendent objects. This parameter mainly pertains to sorting the directory entries corresponding to descendant directories of the requested directory since the requested directory includes the aggregate value of blocks used by each returned directory entry.

Figure 4:
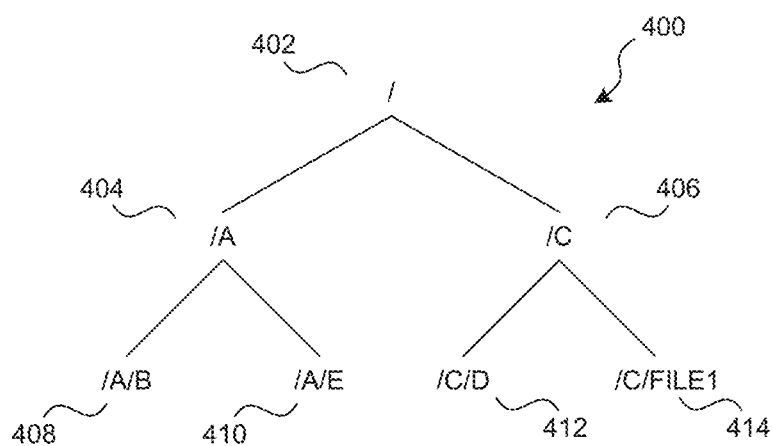
FIG. 4 shows a sample filesystem tree of filesystem objects.

FIG. 4 is a hierarchical tree-structure 400 representative of hierarchical data storage in the facility. The tree 400 includes filesystem objects 402, 404, 406, 408, 410, 412, and 414, including a root directory 402. As previously mentioned, a filesystem object can be a directory or a file. Each filesystem object 402, 404, 406, 408, 410, 412, and 414, in a tree typically stores and maintains a relatively current version of attributes and metadata for that filesystem object.

In particular, each filesystem object that is a directory 402, 404, 406, 408, 410, and 412 contains metadata and other data unique to the directory which characterizes files in that directory. The other unique data includes metric values of aggregated attributes for each file in, or "contained" by, the directory, along with information viable to access the contents of each of those files.

Each filesystem object that is a file 414 in the filesystem tree also contains metadata and one or more attributes characterizing that file, which may be aggregated and stored as a metric value in the directory under which that file is located in the filesystem tree. The metadata, aggregated values and other attributes may be stored in an inode portion of the filesystem object, which is later discussed with reference to FIG. 5. In some embodiments, the aggregated values for an individual file are stored in the directory entry pointing to that file. In some cases this is useful, for example, to accelerate operations that parse aggregate values for each entry in a directory.

Figure 5:
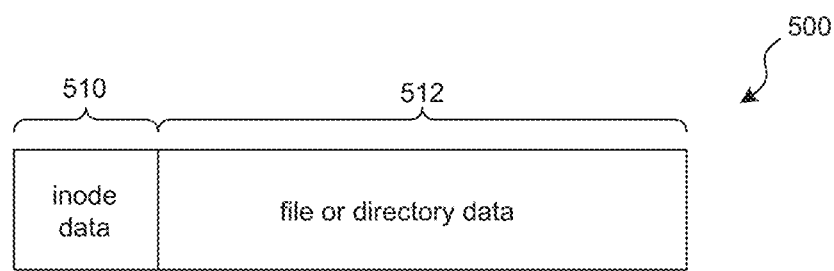
FIG. 5 shows a representative view of the contents of a filesystem object.

FIG. 5 illustrates an example linear view of the contents stored in a filesystem object 500. The filesystem object 500 can be stored in a data structure and can be of variable size. Each filesystem object 500 in the facility includes inode data 510 stored in one or more blocks at a particular filesystem location and file or directory data 512 stored at a corresponding filesystem location. Though the inode data is described as being stored both adjacent to and separate from the corresponding file or directory data 512, this inode data can be stored in association with any directory or file in any on-disc format and in any type of filesystem. In some embodiments, for filesystem objects that are directories, the directory data 512 contains a directory map data structure identifying each filesystem object contained by the directory by its name and inode number. For filesystem objects that are files, the file data 512 contains an extent list data structure identifying the disc blocks containing the file contents by the filesystem addresses usable to locate those blocks. In some embodiments, the facility also maintains a global data structure for mapping inode numbers from each inode in the filesystem tree to the filesystem location at which the corresponding inode data is stored. In some embodiments, the facility may store a copy of this global data structure on each node (e.g., in FIG. 2).

For filesystem objects which are directories, the inode data 510 includes both the attributes of the associated directory and current metric values of aggregated attributes for each filesystem object contained by that directory. For example, the inode portion of a directory corresponding to the directory's attributes includes data such as an owner, permissions, number of links to the directory, the size of the directory in bytes or blocks (my_cap_usage), file count in the associated directory (my_num_files), most recent access time (atime), minimum access time, number of times accessed, creation time, modification time, and change (edit) time. The inode portion of the directory corresponding to the aggregate metric values includes data such as, for example, total number of files in and contained by the directory (num_files), total block usage by the directory and files contained by that directory (capacity_usage), total number of directories contained by the directory (num_directories), and various other metrics within the scope of the art. In some embodiments, the inode data also includes metric values corresponding to the Input/Output (I/O) operations performed on the associated directory (or any filesystem object contained therein) and the resource consumption to perform those operations. In some embodiments, the operations include a number of accesses, number of disk actions for accesses, number of memory accesses for accesses, and number of blocks consumed.

For filesystem objects which are files, the inode data 510 may indicate file attributes such as a last access date (file_access), a name (file_name), a type (file_type), and a size (file_size). The file access time may include a date and/or timestamp indicating the last time the file was accessed by a client. The file type may indicate the format in which the file is stored. The file size may indicate the number of bytes, kilobytes or data blocks used to store the file.

The aggregate metrics stored in the inode data for each filesystem object reflect a current state of the files or file contained by that filesystem object, including the corresponding attributes of those files. The aggregate metrics stored in the inode data for each directory also include aggregated values for file attributes of each file contained by that directory. Accordingly, each time that a file contained by a directory or descendant directory of that directory changes, the aggregate metrics in the inode data of the directory are also timely updated to reflect those changes. For example, to reflect the current state of attributes for files contained in a directory of a filesystem tree, the metric values stored in the inode data may be updated (i.e., reconciled) each time that an change is made to a file in that filesystem tree. Accordingly, there are times when updates to one directory or file may not be immediately reflected in all of that directory or file's ancestors. If the updates have not been applied to a particular ancestor directory, the unreconciled data for that directory is reflected in a descendant filesystem object from where the change originated. If the updates have been applied to that directory, an unreconciled value and reconciled value in the descendant filesystem object from where the change originated can reflect it. For example, in some embodiments, if the unreconciled value and reconciled value are equal, this indicates that the metric values in the parent directory's inode data fully reflect the filesystem object's metrics. Maintaining knowledge of whether the attributes for a filesystem object are current or not can provide additional visibility into that filesystem tree. Accordingly, a reconciled value and an unreconciled value corresponding to each attribute in a directory may be stored in the inode data. In some embodiments, the metric values for any given directory are not returned to a client if a descendant directory indicates that there is unreconciled data requiring an update in that directory.

Each change or update to an individual file in a filesystem tree is reflected in the changes to the attributes stored in the inode data of that filesystem object and in any ancestor directories with which that filesystem object may be associated. This updating may be performed up the filesystem tree until the metric values corresponding to the changed attribute stored in the root directory's inode data are updated. In some embodiments, the facility asynchronously updates each filesystem object with respect to a received change or alteration to a file stored in the filesystem tree. In some embodiments, the facility systematically traverses the filesystem tree to update each filesystem object. In some such embodiments, the facility continuously updates filesystem objects in a filesystem tree to reflect changes to any file or directory contained in that filesystem tree. As previously mentioned, in some embodiments, the filesystem objects in the filesystem tree are synchronously updated with respect to received changes or alterations to files stored in those filesystem trees. So, updates to filesystem objects in the facility may only be performed each time a change to a filesystem object is received for that respective tree. Various other methods for determining when to update filesystem objects and corresponding inode data stored in those filesystem objects are further discussed with reference to FIGS. 6-7D.

In some embodiments, the inode data 510 includes a value of a metric unreconciled to a parent directory, such as an unreconciled to parent block count and reconciled to parent block count which, when equal, indicate that all updates to the parent directory containing that filesystem object are current.

For example, if an attribute of a file (e.g., file_size) is updated in response to changes made to that file, then the updated file_size attribute will also need to be reflected in the metric corresponding to that file_size attribute in the parent directory and in any ancestor directory of that file. To indicate when the updated attribute is not yet reflected in the corresponding metric of the parent directory, a value of the metric unreconciled in the parent directory indicates a different value than the metric reconciled to parent directory. Each attribute of the file for which a metric value is stored in a parent directory can maintain these unreconciled to parent and reconciled to parent values. When these values differ, it indicates to the facility that the parent directory of that file needs to be updated by the difference between the values during a subsequent I/O operation.

In some embodiments, the facility maintains a separate "list" of filesystem objects having unreconciled data in a filesystem tree instead of, or in addition to, indicating the value of the unreconciled to parent data in the inode data of each filesystem object. In some embodiments, the facility maintains this separate list in volatile memory. Maintaining this list and performing a reconciliation process due to block count, or other attribute changes in a filesystem object, are further discussed with reference to FIGS. 7A-7E.

Referring back to FIG. 5, in some embodiments, the inode data and the second portion of the filesystem object data can be stored at specific location in a block storage unit used to store the filesystem object. For example, in some embodiments, the facility can store a pointer to that specified storage location to obtain the requested data. The filesystem object data includes data such as the payload or actual file data for that filesystem object. For example, in a directory, the data may include information pertaining to the files contained by that directory, such as the file paths and paths to any child directories. Accordingly, the directory data includes information for each file accessible via that directory and the location of the file. Each file contained by a directory may be included in various other directories in the facility as well. For example, as shown in FIG. 4, directory /A 404 defines a subtree made up of directories /A 404, /B 408, /E 410, each of which may contain various data files. The filesystem object for directory /A 404 therefore may store inode data having aggregated values for each of the files contained by /A, /B, and /E, and directory data including paths for each of those files. Any additional file-related or directory-related data within the scope of the present disclosure may also be stored in the second portion of the filesystem object.

Figure 6:
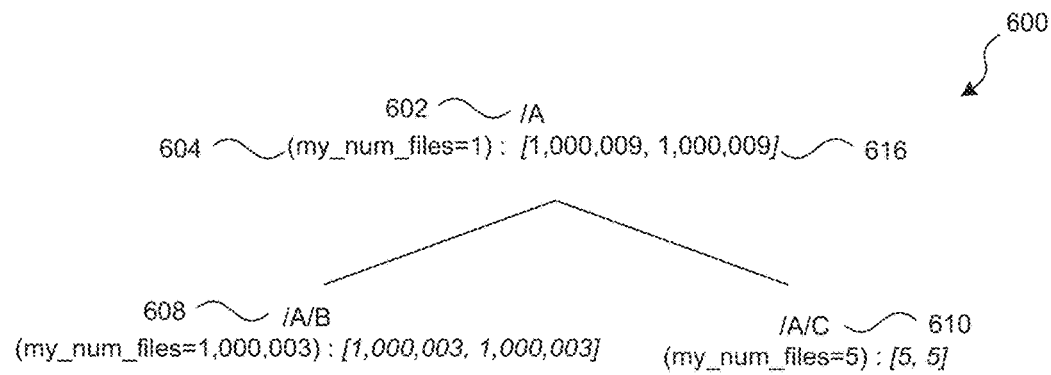
FIG. 6 shows a tree structure indicating a size attribute for a filesystem object and an aggregate size metric value for the filesystem object and descendent filesystem objects in a subtree of the filesystem object.

FIG. 6 illustrates an example subtree 600 of filesystem objects including at least one attribute and associated metric value for each filesystem object in that subtree. The subtree is defined by a directory /A 602. The subtree 600 may be located in a larger filesystem tree structure, such as the filesystem tree 400 shown in FIG. 4, which is defined by the root directory "/" 402. In the illustrated embodiments of FIG. 6, each filesystem object includes three values. The my_num_files 604 value of "1" in directory /A 602, is an attribute indicating a number of files contained by that particular directory (local file count). The second two values, represented in an ordered pair 616, indicate a reconciled and an unreconciled metric value [reconciled, unreconciled] for that attribute (num_files) in a parent directory (e.g., "/" in FIG. 4) of directory /A 602. In the ordered pair 616, the right value is a value of that metric that is unreconciled in the parent directory [1,000,009, 1,000,009] and the left value is a value of the metric that is reconciled in the parent directory [1,000,009, 1,000,009]. This ordered pair indicates whether the metric value in the parent of the filesystem object (e.g., directory /A 602) fully reflects any updates to that attribute (numfiles) in any descendant filesystem object. In FIG. 6, since both metric values 616 in the ordered pair are equal, the corresponding metric in the parent directory (e.g., "/" in FIG. 4) fully reflects the updated metric value.

In FIG. 6, the num_file metric value is a hierarchical aggregate of the number of files (num_files) contained by each descendant directory (e.g., /B 608, /C 610) of that directory (/A 602) and any files directly contained by the directory itself (aggregate file count). For example, in the illustrated embodiment, a metric value (not shown) for the num_files attribute in directory /A 602 is "1,000,009". This metric value includes the aggregate values of my_num_files in each descendant directory (e.g., "1,000,003" for /B 608, "5" for /C 610), which include the aggregate values of any descendant files (e.g., FILE1, FILE2, etc.) in those descendant directories. The metric value in directory /A 602 also includes any local files, e.g., "1" 604, contained by the directory /A 602 itself for which that metric value is calculated. Accordingly, when a client requests a metric value for an attribute of a directory in a filesystem tree, which defines a subtree, that value reflects an aggregation of the attributes in any descendant directory plus the attributes of the directory on which the aggregation is performed.

For a large filesystem tree structure including many directories, performing an aggregation operation on all filesystem objects in that filesystem tree can consume considerable processing resources and elapsed time to determine a metric value for a given directory. However, as previously discussed, these additional metrics that include aggregate values of file attributes, are stored in the inode data for each directory. The inode data may be updated each time a filesystem object is updated. This inode data maintains a relatively accurate indication of the attributes for a given directory, even if recent changes to one or more files in that directory are not yet reflected. Accordingly, this allows for rapid and easy access to current filesystem attributes, which may facilitate performance and allocation of resources in both large and scalable filesystems FIGS. 7A-7E illustrate at least one method for updating attributes and associated metric values in filesystem objects of a filesystem tree. The method tracks each filesystem object to which a change is applied in a file path from the updated file to the root directory. To implement such tracking, each modified filesystem object may be added to a set of unreconciled filesystem objects, one or more of which is iteratively updated in the tree during a subsequent operation. For example, the set 722 may be a list of unreconciled filesystem objects maintained in a filesystem tree. Accordingly, the set 722 of filesystem objects may include both files and directories whose attributes have been changed, but not yet updated to reflect the change, and which may require an update in an ancestor filesystem object.

Figure 7A:
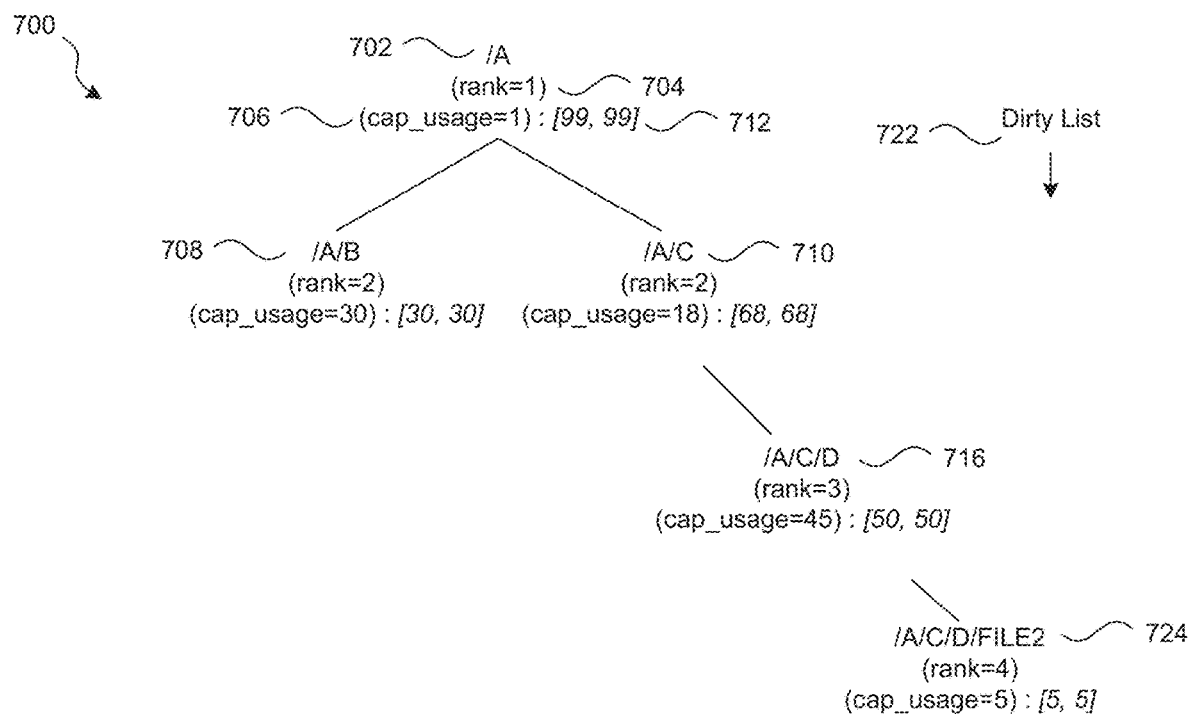
FIG. 7A shows a tree structure indicating rank attributes, capacity usage (cap_usage) attributes and corresponding reconciled and unreconciled to parent metric values for each directory in that tree.

FIG. 7A is example of a tree structure for data stored in a filesystem, such as for directory /A shown in FIG. 6. The filesystem tree 700 includes a directory /A 702 and various descendant directories /B 708, /C 710, and /D 716, and a file FILE2 724 of the directory /A 702. The directories and file also indicate two attributes that the facility maintains in the inode data stored in each filesystem object, which is either a directory or a file. For example, in directory /A 702, the two attributes include a rank 704 and a capacity usage (cap_usage) 706. The rank indicates a level of the filesystem tree in which the filesystem object is located. For example, the directory /A 704 indicates "rank=1" since it is at the top of the tree hierarchy (and, a first descendant of the root directory "/" in FIG. 6). The filesystem object's capacity usage 706 identifies a number of blocks used by a particular filesystem object as discussed with reference to FIG. 3. In FIG. 7A, directory /A 702 has a cap_usage of "1", though the aggregate cap_usage of the sub-tree defined by directory /A 702 has a cap_usage of "99" (i.e., 5 (FILE2)+45 (/D)+18 (/C)+30 (/B)+1(/A)=99). Though the rank and cap_usage are attributes used in the updating process of the following description, it is understood that various additional attributes are considered and either or both the rank and cap_usage are not required attributes within the facility.

The filesystem tree in each of FIGS. 7A-7E also indicate an ordered pair [reconciled, unreconciled] 712 providing the value of the cap_usage metric for the reconciled to parent block count and the unreconciled to parent block count in each filesystem object in that tree 700. These values 712 indicate whether changes to the block count value in each filesystem object have been updated (e.g., are current) in the parent directory of that respective filesystem object. Accordingly, in some embodiments, if all updates have been reconciled to a parent directory of a given filesystem object, the reconciled cap_usage and unreconciled cap_usage ordered pair 712 are equal. FIG. 7A illustrates such an embodiment since the aggregate block count in the ordered pair 712 is equal [99, 99].

Figure 7B:
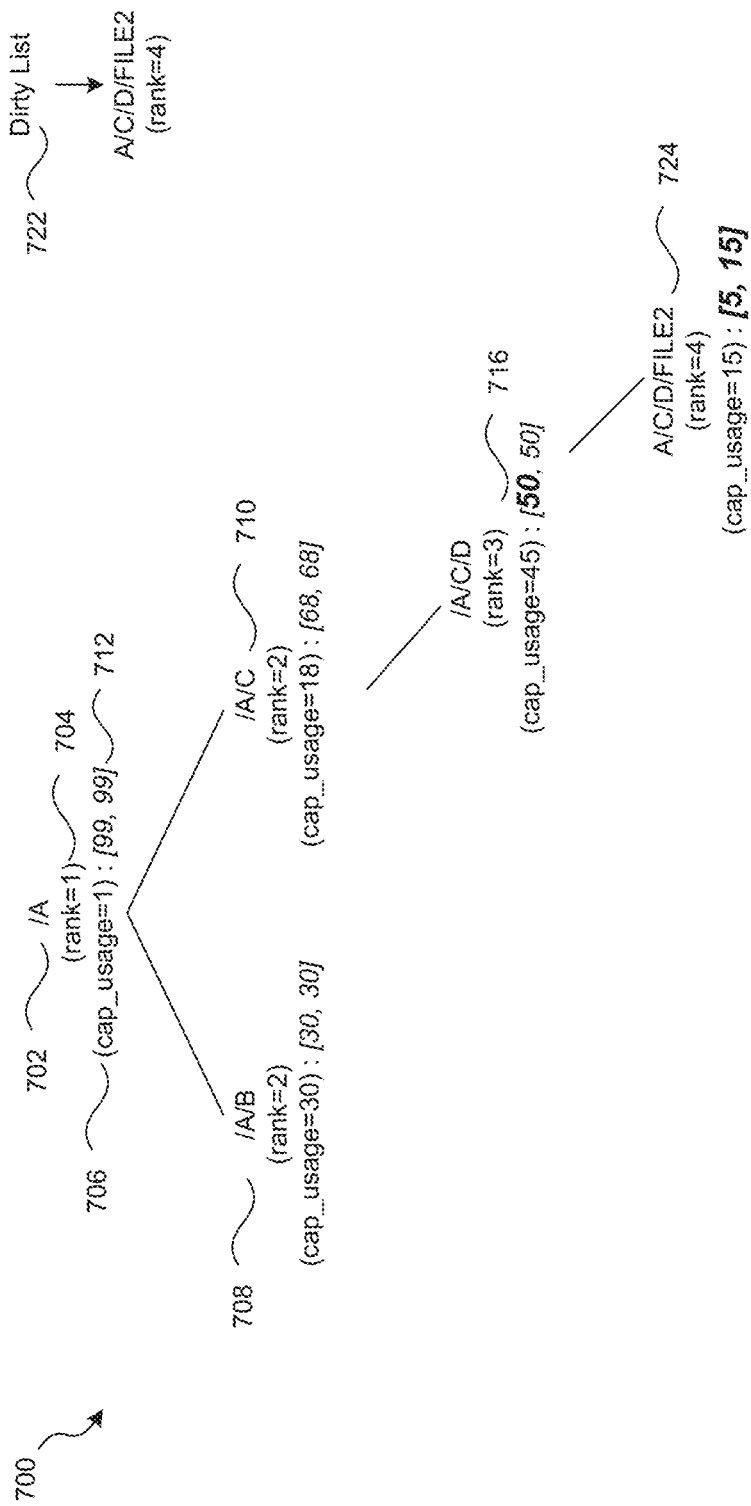
FIGS. 7B-7E shows the tree structure of FIG. 7A and a dirty list for updating the reconciled and unreconciled to parent metric values in each directory of the tree.

FIG. 7B illustrates the filesystem tree 700 after changes are made to FILE2 724 in directory /D 716. When the changes are made to a file, in some embodiments, the changes are immediately reflected in the attribute values stored among the inode data for that filesystem object. Accordingly, FILE2 724 reflects an updated cap_usage of "15". However, FILE2 724 is still considered "unreconciled" since the changes to that file still need to be reflected in the directory data and the attributes stored in the inode data of the directory /D 716 which contains FILE2 724. As a result, FILE2 724 is then added to a separate file for a set 722 of "dirty" filesystem objects. The set 722 tracks the filesystem objects requiring an update to reflect changed attributes of a changed file (e.g., FILE2) in that directory (e.g., /D). A "dirty" filesystem object is also indicated in reconciled and unreconciled values (e.g., FILE2 724) that provide differing numbers (e.g., [5, 15]) for reconciled and unreconciled block counts in its parent directory /D 716.

Figure 7C:
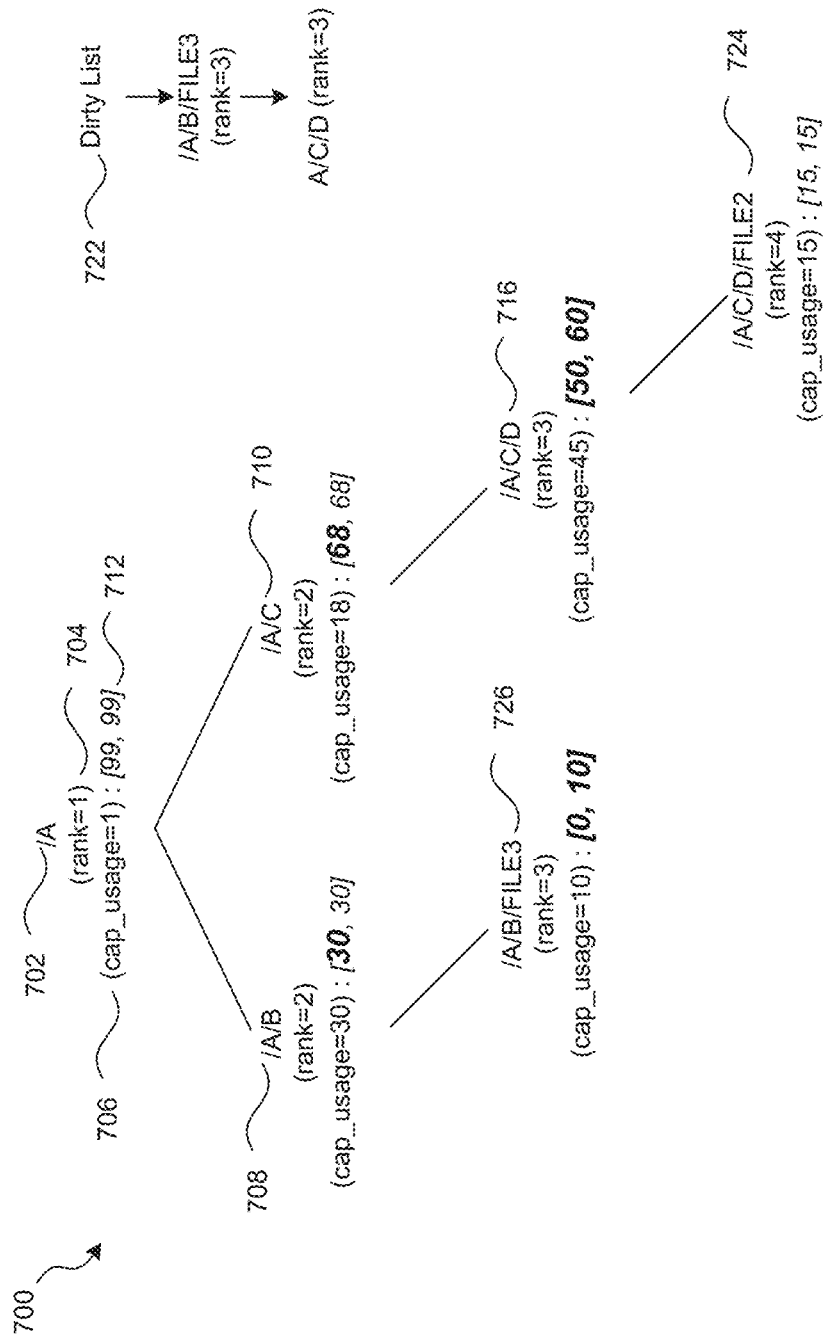

Once the corresponding metrics in the inode data for FILE2 724 have been updated in directory /D 716, the next associated ancestor filesystem object in the file path from FILE2 724 to the root directory (not shown), is added to the set 722 of dirty filesystem objects being tracked for updating. So, after reconciliation is performed in FIG. 7B, the next filesystem object added to the set 722 is directory /D 712 (shown in FIG. 7C). This is because the new value of the cap_usage attribute may alter at least one metric value of the aggregated attributes stored in the inode data of the parent directory /C 710, which contains directory /D 716 (and FILE2 722). Additionally, the reconciled and unreconciled block counts in FILE2 724 are then updated [15, 15] to reflect the reconciled updates to the aggregate metrics in directory /D 716. The reconciled and unreconciled counts in directory /D 716 are also updated to reflect the unreconciled blocks [50, 60] in its parent directory (IC 710) as illustrated in FIG. 7C.

In various embodiments, the facility stores the set 722 of dirty filesystem objects either as persistent data (on-disk) or volatile data (in-memory), each of which has its advantages and disadvantages. For example, where the set 722 stored in persistent storage, no initial inode scan is necessary at startup, but updates to each filesystem object are slower than when the set 722 is maintained in volatile storage. Where the set 722 is stored in volatile storage, normal operations are performed faster, but an initial inode scan is required at startup.

In some embodiments, if more than one filesystem object is located in the set 722, the filesystem object having the lowest rank (e.g., farthest file path length from the root directory) in the filesystem tree may be updated first such that its attributes indicate the updated cap_usage value. This ensures that all updates to filesystem objects in the filesystem tree are not repeated, which improves the efficiency of the facility. The filesystem objects within the set 722 of filesystem objects to be updated may be reconciled in an iterative process. Additionally, the filesystem objects in the set 722 may be sorted in order to remove duplicates and to update entries having the lowest rank first. This is done in order to avoid unnecessary and repeated updates to a filesystem object whose descendent also is included in the set 722.

As discussed previously, any updates to a filesystem object may be reflected in hierarchical aggregates indicated by the metric values stored in the inode data for each filesystem object. Once a filesystem object is updated, the filesystem object's entry in the set 722 is removed and the filesystem object's parent directory is added to the set 722. Additionally, the reconciled and unreconciled values for that attribute are updated to reflect the unreconciled data in that filesystem object's parent directory. The metric values indicated in each filesystem object may be updated in a direct path of the directories from the updated file to the root directory. Thus, only the filesystem objects in the path of the file to the root directory need be updated. Unaffected filesystem objects and subtrees are therefore not traversed or updated. So, system resource consumption may be reduced, relative to the time required for iterative scans of the full filesystem tree, and metric values of filesystem object attributes may be updated more quickly since system resources are not allocated to perform unnecessary tasks.

In some embodiments, where the facility receives a request for metric values in a "dirty" filesystem object (i.e., in set 722, or a descendant thereof in set 722), the facility updates only the filesystem object (and any descendants) in the set 722 prior to servicing the request. In some embodiments, the facility updates all filesystem objects in the set 722 prior to servicing a request by a user. In such embodiments, the facility can ensure the most up-to-date metrics for the request. To alternatively determine whether a filesystem object (or descendant thereof) is not completely current, the facility can also check the reconciled and unreconciled count for each descendant of that filesystem object. If any counts differ, the facility can then either update each of the descendants to the requested filesystem object prior to servicing the request, or update the entire tree to the root directory, as previously mentioned, FIG. 7C illustrates the filesystem tree structure 700 in which the change to FILE2 716 is subsequently updated in the inode data associated with directory /C 710. This is indicated by the differing reconciled and unreconciled values [50, 60] of the ordered pair in directory /D 716, which signify that only fifty blocks are currently reconciled in directory /C and sixty blocks need to be reconciled to make the metric values stored in directory /C current. The reconciled value "68" in the ordered pair of its parent directory /C illustrates where the update is to be applied. Accordingly, the set 722 of filesystem objects reflects an entry of directory /D 710. The set 722 of filesystem objects also includes a newly added filesystem object, FILE3 726, for which the cap_usage of "10" needs to be updated in the cap_usage metric of its parent directory /B 708. Accordingly, FILE3 indicates reconciled and unreconciled ordered pair values of [0, 10]

since 10 blocks need to be added to the reconciled block count (i.e., "30") in directory /B 708 to make that directory's aggregate attributes current.

As shown in FIG. 7C, directory /D 716 and FILE3 726 may concurrently be processed during the next iteration since both have a rank of "3". In some embodiments, each iteration, or processing of filesystem objects in the set 722 of filesystem objects, removes filesystem objects on corresponding levels (e.g., "rank" in FIG. 7C) of the filesystem tree structure. In other embodiments, each filesystem object in the set 722 may be processed and updated sequentially, based on the order in which that filesystem object is placed in the set 722. In the aforementioned embodiment, one or more entries in the set are processed during each iteration.

Figure 7D:
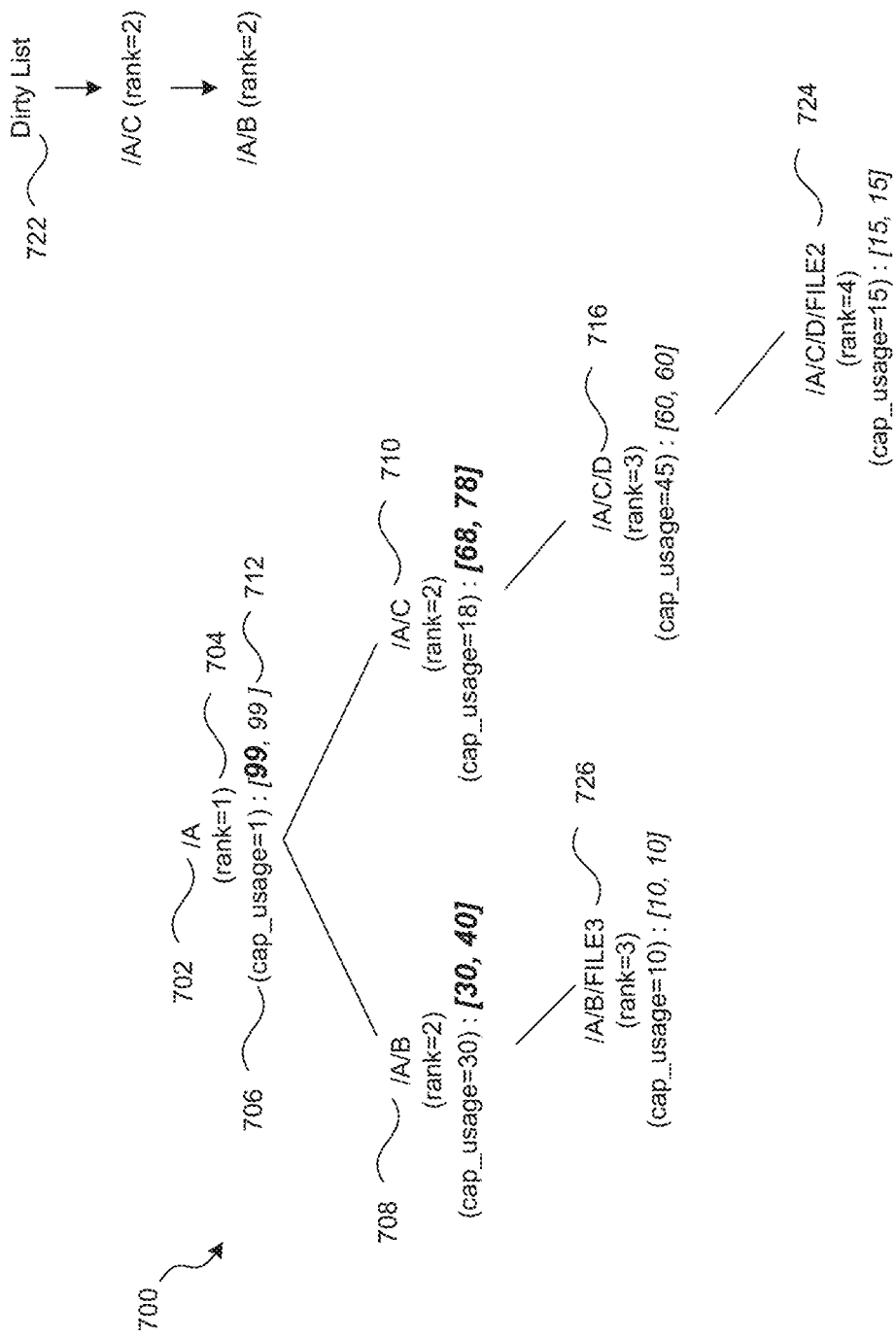

FIG. 7D illustrates a tree structure 700 in which directory /D 716 and FILE3 726 reflect the updates processed during the iteration performed in FIG. 7C. Accordingly, the cap_usage aggregate attribute in the inode data for directory /B 708 reflects an updated unreconciled to parent metric value of "40" in the ordered pair values [30, 40] in that directory. Similarly, directory /C 710 reflects an unreconciled value of "78" in the ordered pair [68, 78]. These unreconciled values both reflect unreconciled cap_usage metrics in the common parent directory /A 702 as well as indicate those directories as being "dirty". So, these parent directories (IC and /B) in the direct path of the processed filesystem objects (/D and FILE3) are added to the set 722 of filesystem objects to be updated. The set 722 then includes directories /B 708 and /C 710, which are concurrently processed during the next iteration because both are rank "2" in the filesystem tree 700. The reconciled and unreconciled values in FILE3 726 and directory /D 716 are also updated to indicate updates applied to their respective parent directories and those filesystem objects are then removed from the set 722 of filesystem objects.

Figure 7E:
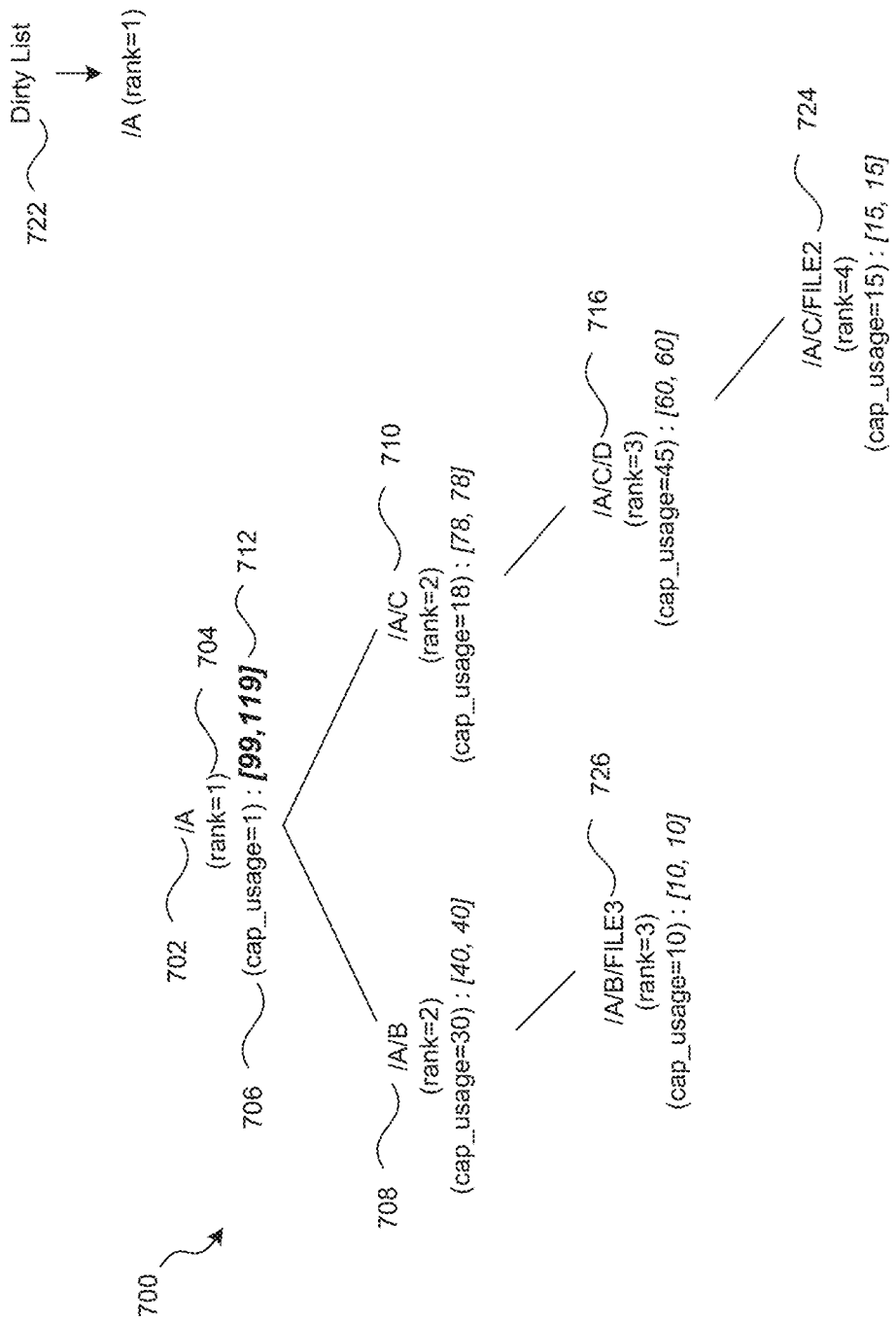

Once directories /B 708 and /C 710 are processed, as illustrated in FIG. 7E, directory /A is then added to the set 722 of dirty filesystem objects. Since that directory is the parent directory for both /B 708 and /C 710, the duplicate entry is removed in order to prevent unnecessary processing of directory /A on the next iteration. The reconciled to parent and unreconciled parent values 712 for directory /A 702 are also updated to reflect an unreconciled cap-usage value (99, 119) in its parent directory (not shown). The reconciled and unreconciled values in directories /B 708 [40, 40] and /C 710 [78, 78] can also be updated to indicate an updated aggregate metric value in the parent directory (/A). Once directory /A 702 has been processed in a similar manner during the next iteration, directory /A 702 will be removed from the set 722 and the value for that filesystem object attribute will also be updated to "119". Accordingly, the ordered pair will be [119, 119].

An alternative approach to update the aggregate metric value in, for example, directory /A 702 (in FIG. 7D), is to take the difference between the reconciled and unreconciled values for cap_usage in both directories /B 708 and /C710, sum (e.g., sum ( )) those differences, and add that sum to the cap_usage metric value stored in directory /A 702. For example, in directory /B 708 the difference [30, 40] is "10" and in directory /C 710 the difference [68, 78] is "10". So, "20" is the sum of those differences, which is then added to a prior stored, or reconciled value ("99") for cap_usage in directory /A 702. If during this update a change occurred to a lower ranking filesystem object in the filesystem tree (e.g., /D 716), prior to processing the update on directory /A 702, then directory /A 702 would remain in the set of filesystem objects 722 until directory /D 716 is processed.

Each lower ranking filesystem object (e.g., from /D up) will then be processed in a similar manner described above, prior to directory /A 702. This prevents additional processing on directory /A 702, such that all updates on that directory may be processed in the same iteration and reflect the most current update to cap_usage (or other attribute) in the inode data of that directory.

Accordingly, in some embodiments, the facility updates a directory's aggregated metric value for a specific attribute by summing a difference between the reconciled and unreconciled values in a child directory with the metric value previously stored in that directory. In another example, referring back to FIG. 7B, each directory and file maintains a count of [reconciled, unreconciled] data to facilitate aggregation of filesystem object attributes. The difference between the unreconciled data in directory /D is equal to "10" (reconciled=50, unreconciled=60). So, to determine the metric value for that attribute of cap_usage in directory /NC, the filesystem simply sums "68" plus the difference "10" to perform the aggregation. This value can be verified, or alternatively determined, by recalculating values of all entries in directory /C to generate a new aggregate value.

Though the aforementioned embodiments maintain a separate list (e.g., the set of filesystem objects 722) to update metrics in the facility, the metrics can be updated by other methods which do not include such a list or associated filesystem object ranks. For example, in some embodiments, the facility ensures the currency of all of the metrics in the entire filesystem tree each time a filesystem object is updated. In effect, each time a filesystem object is updated, the system traverses the filesystem tree in which that filesystem object is stored to the root directory and updates the metrics in each directory of the direct path from the filesystem object location in the filesystem tree until the root directory is updated to also reflect the update. In some embodiments, an asynchronous, or background process continually traverses trees accumulating and updating metric values for file attributes in the filesystem objects.

To handle filesystem object updates such as deletion of a file or directory from a filesystem tree, the reconciled and unreconciled data for each ancestor directory can be updated in a similar manner as previously described with reference to FIGS. 7A-7E. However, instead of adding the difference between the reconciled and unreconciled values in the filesystem object, the value of the deleted filesystem object is considered a negative unreconciled value in the parent directory associated with that filesystem object. Accordingly, the difference between the reconciled value in the deleted filesystem object and the unreconciled value in the parent is subtracted from the parent's reconciled value during a subsequent operation. Based on this adjustment, each directory in a path from the parent of the deleted filesystem object to the root is ultimately updated normally, such as through the process described in FIGS. 7A-7E (i.e., placing each filesystem object on a separate list 722). Furthermore, any unreconciled value in the deleted filesystem object is ignored since that filesystem object is being removed from the filesystem tree. To handle updates such as renaming a filesystem object, e.g., moving the filesystem object to another directory, the facility performs the aforementioned deletion process under the current name, and creates a new filesystem object under the new name, such as described in FIG. 7C with reference to FILE3. If the filesystem object had any unreconciled data, e.g., differing values in the ordered pair, the unreconciled value remains consistent throughout the deletion and creation process. The updating process for the unreconciled data then occurs normally (e.g., via the process in FIGS. 7A-7E) during a subsequent iteration on the renamed filesystem object.

For filesystem object attributes not having integer values, metric values can be updated by aggregation functions (e.g., latest( ) which compare a prior value of that respective value in each filesystem object being updated. For example, the attribute can include an raccess attribute identifying a most recent access date/time ("atime") of the filesystem object. The facility can compare the previous raccess date in a directory with an updated raccess date received from a descendant filesystem object, as opposed to looking at the raccess dates of all of the descendants in a subtree defined by that directory. For certain metrics and/or aggregation functions, a new aggregation can be performed across all filesystem objects in a tree or subtree in order to update metric values.

In some embodiments, the facility retrieves information about characteristics of a node, a cluster, or the entire filesystem from statistical sampling of a filesystem tree. The facility chooses the fraction of samples taken from files in each directory of the filesystem tree in such a way as to achieve a sample population that is appropriately distributed across the filesystem tree. In some embodiments, the facility determines the overall number of samples taken to satisfy a desired confidence level in the results.

Figure 8:
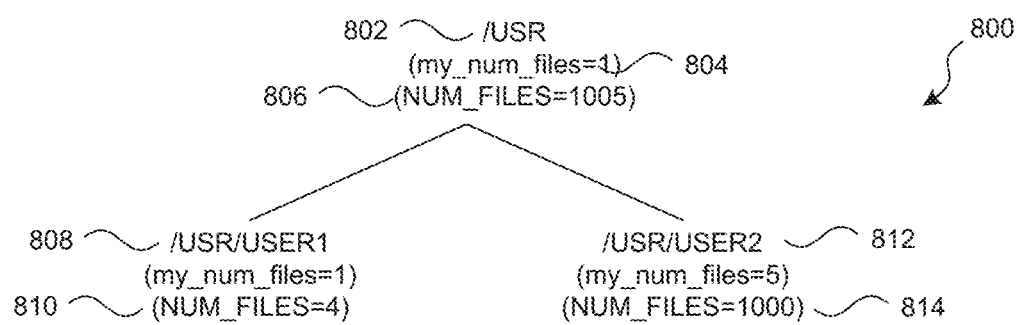
FIG. 8 shows a tree structure indicating weighted metadata for sampling.

FIG. 8 illustrates an unbalanced filesystem subtree 800 defined by a directory /USR 802, which has two child directories, directory /USER1 808 and directory /USER2 812. The shown subtree includes two file types, music 818 and other (non-music) data 822, specific to each of the child directories. In an example, the facility performs sampling using block count attribute (i.e., cap_usage) to answer the question, "what percentage of files stored in the subtree are music files?" Where the directory /USER1 808 includes only four data files 810, while the directory /USER2 812 includes one thousand music files 814. A simplistic even sampling performed on the root directory /USR 802 would result in a sample from each of the descendant directories 50% of the time. Accordingly, the sampling would result in a 50/50 split of music and data files in the root directory /USR 802. Since the file count attribute for each directory, /USER 1 808 and /USER 2 812, indicates that the root directory /USR 802 is not made up of 50% music files and 50% data files, these sampling results are clearly skewed and inaccurate. Thus, this approach to sampling may result in the erroneous conclusion regarding the makeup of a particular directory.

To avoid the aforementioned errors, the facility uses a fair sampling approach in which it uses the metric values stored in the inode data of the directories to weight these directories in a manner that determines the likelihood that each file sample gets taken from each directory. By weighting the directories in this way, the facility achieves an improved representative sampling of the composition of the data in the filesystem tree structure. Additionally, since any attribute of a filesystem object can be utilized to weight the directories, the representative sampling is improved for each individual filesystem attribute.

To perform fair sampling on the filesystem subtree 800, the facility uses, for example, a NUM_FILES attribute associated with each directory to establish sampling frequency weights for each directory of the filesystem tree. The NUM_FILES value is the total number of files associated with a directory summed with the files in all descendant directories. Using this NUM_FILES attribute therefore answers the question, "what percentage of files are music files?" So, the total number of files to be sampled between the two directories /USER1 808 and /USER2 812 for the root directory /USR 802 is 1004 since the NUM_FILES attribute 806 for the root directory indicates "1005" and the my_num_files attribute for the root directory indicates "1". By storing the aggregate file count in the inode data (e.g., 816, 820) of each directory, the system can quickly query those directories and determine that the files under directory /USER1 808 should be sampled "4" times out of every "1004" samples, or approximately 0.4% of the time, and the files under directory /USER2 812 should be sampled "1000" times out of every "1004" samples, or 99.6% of the time. If one hundred samples are taken in this manner, the sample results would indicate ~99% of the files are music files in the root directory /USR 802. This result is more accurate than the 50% music files calculated without using the metric values corresponding to the aggregated attributes of the files contained by the root directory /USR 802. This type of weighted sampling may be applied to any attribute of files within a filesystem tree in the facility and may facilitate improved visibility into the files contained by that tree. For example, weighted sampling may be used to determine a file size for two directories including unbalanced average file sizes, e.g., one includes .mp4 files and the other includes .doc files.

Figures 9A, 9B:
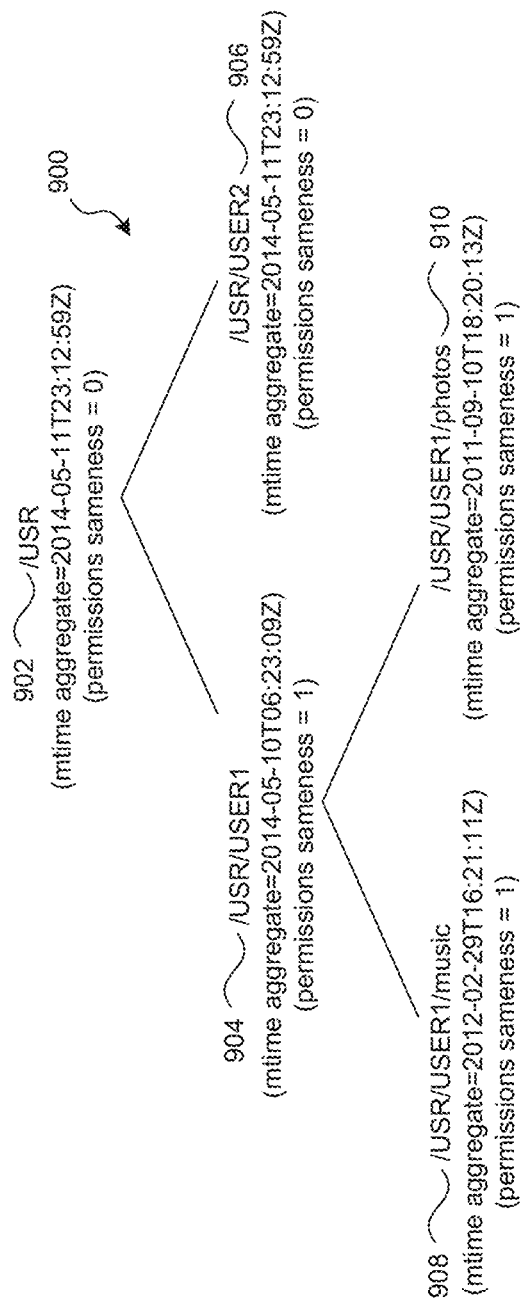
FIG. 9A illustrates a filesystem subtree 900 illustrating time-based aggregates and "sameness bits" in accordance with embodiments of the facility.
FIG. 9B is a table that includes a sample of files within the folders represented in subtree 900 and their corresponding mtimes and access permissions.

FIG. 9A illustrates a filesystem subtree 900 illustrating time-based aggregates and "sameness bits" in accordance with embodiments of the facility. In this example, aggregations of last modified times ("mtime") associated with files in the filesystem subtree 900 are shown. Subtree 900 includes five folders 902, 904, 906, 908, and 910. In an example, the facility generates an mtime aggregate for each folder by identifying, for each folder, the mtime for all of the files in that folder (and subfolders) and sets an mtime aggregate for that folder as the mtime of the most recently modified file in the folder or its subfolders. In this manner, the most-recently modified file determines the mtime aggregate for the folder storing that file and each folder above that folder in a directory tree. In this example, the file with the most recently modified file in subfolder 908 has an mtime of 2012-02-29T16:21:11Z and the most recently modified file in subfolder 910 has an mtime of 2011-09-10T18:20:13Z. The time-based aggregations enable efficient searching of files or folders that have time-based attributes within a specified range, including open-ended ranges. For example, if a user is searching for all files with an mtime after May 10, 2014, the facility can skip searching files and folders within folder 904 because its mtime aggregate is 2014-05-09T23:12:59Z, which is before May 10, 2014. In some embodiments, the facility stores aggregate MAX and MIN values for attributes, such as a MAX mtime aggregate and a MIN mtime aggregate. Thus, if the user is searching for all files with an mtime between Jan. 1, 2011 and Dec. 31, 2013, then the facility can use the MAX and MIN mtime aggregates to quickly determine whether a folder can be skipped (i.e., if the MIN mtime aggregate is greater than the upper bound of the range specified by the query or the MAX mtime aggregate is less than the lower bound of the range specified by the query). As another example, if the user is searching for the most recently-modified file(s), the computing system can skip folder 904 since its aggregate mtime is earlier than the aggregate mtime of folders 902 and 906. Thus, the computing system will find the most recently-modified file(s) in folder 902 and/or folder 906. In this manner, the facility improves the speed and efficiency with which a computing system can identify files relevant to a query, such as a user-generated search.

FIG. 9B is a table that includes a sample of files within the folders represented in subtree 900 and their corresponding mtimes and access permissions. For example, file /USR/file1 has an mtime of 2010-01-19T06:53:59Z while file /USR/USER1/photos/file2 has an mtime of 2011-09-10T18:20:13Z. The user permissions listed represent the access permissions for each of three classes: owner, group, and other. In this example, the access permission represents Unix permissions in an octal (base-8) notation. The access permissions for /USR/file2 and /USR/USER2/file1 are read, write, execute for the owner class and read-only for each of the other classes. The access permissions for each of the other files are read, write, execute for the owner class and read, execute for each of the other classes.

Figure 10:
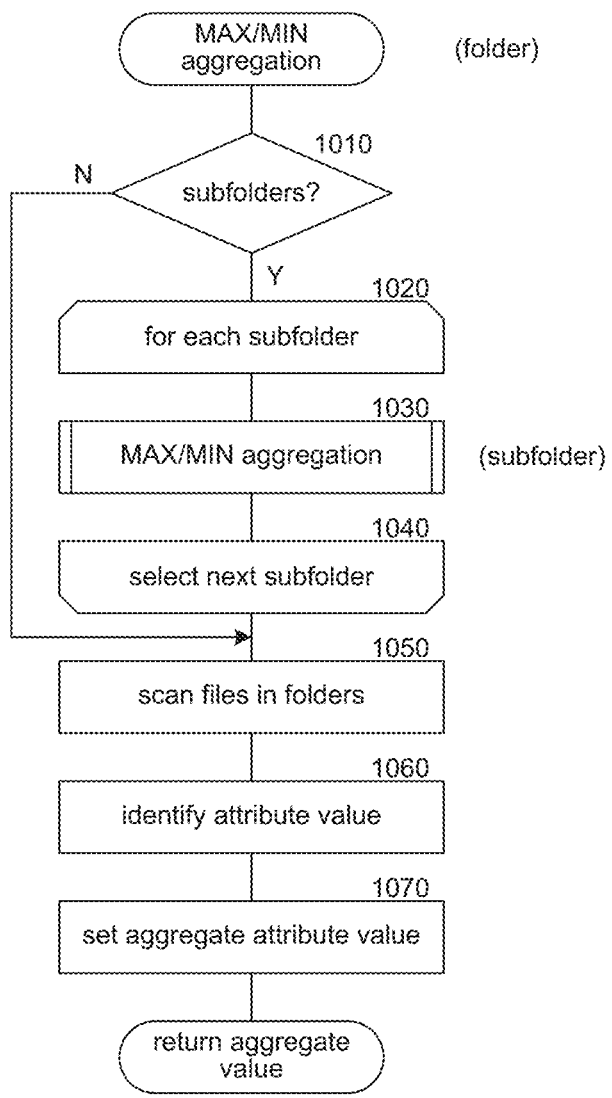
FIG. 10 is a flow diagram illustrating the processing of a max/min aggregation component in accordance with embodiments of the facility.

FIG. 10 is a flow diagram illustrating the processing of a max/min aggregation component in accordance with embodiments of the facility. The facility invokes the component to determine an aggregate value for a folder and the folders in its subtree. In this example, the component has been invoked to determine an mtime aggregate for folder 902. In decision block 1010, if the folder contains any subfolders then the component continues at block 1020, else the component continues at block 1050. In blocks 1020-1040, the component loops through each of the subfolders to determine aggregates for each subfolder. In block 1030, the component recursively invokes the max/min aggregation component for the currently-selected subfolder. For example, when processing folder 902, the component recursively invokes the max/min aggregation component for each of folders 904 and 906 (and 908 and 910 through its processing of folder 904). In block 1040, the component selects the next subfolder and then loops back to block 1020. If all of the subfolders have already been selected then the component continues at block 1050. In block 1050, the component scans all of the files in the folder to identify the file with the extreme attribute value for the aggregation. For example, if a MAX "last accessed" or "atime" attribute is being aggregated then the component identifies the file with the latest (most recent) atime attribute. As another example, if a MIN "date created" or "birthtime" is being aggregated then the component identifies the file with the earliest (oldest) birthtime. In block 1060, the component identifies the extreme attribute from among the identified file and the subfolders of the currently-selected folder. For example, the file with the most recently mtime within folder 904 has an mtime of 2014-05-10T06:23:09Z while its subfolders 908 and 910 have aggregate mtimes of 2012-02-29T16:21:11Z and 2011-09-10T18:20:13Z, respectively. Accordingly, the aggregate mtime value for folder 904 is 2014-05-10T06:23:09Z (i.e., most recent access for all files and subfolders within folder 904). The aggregate mtime for folder 902 is 2014-05-11T23:12:59Z, the most recent access for all files and subfolders within folder 902. In block 1070, the component sets the aggregate value for the currently-selected folder and then returns the aggregate value. While the above process is described in the context of a filesystem subtree (e.g., directory structure), one of ordinary skill in the art will recognize that this process can be applied to a variety of hierarchical structures, such as a b-tree, b+ tree, b*-tree, binary tree, and so on. In some embodiments, a means for generating a MAX aggregate for an attribute comprises one or more computers or processors configured to carry out an algorithm disclosed in FIG. 10 and this paragraph. In some embodiments, a means for generating a MIN aggregate for an attribute comprises one or more computers or processors configured to carry out an algorithm disclosed in FIG. 10 and this paragraph.

Figures 11A, 11B:
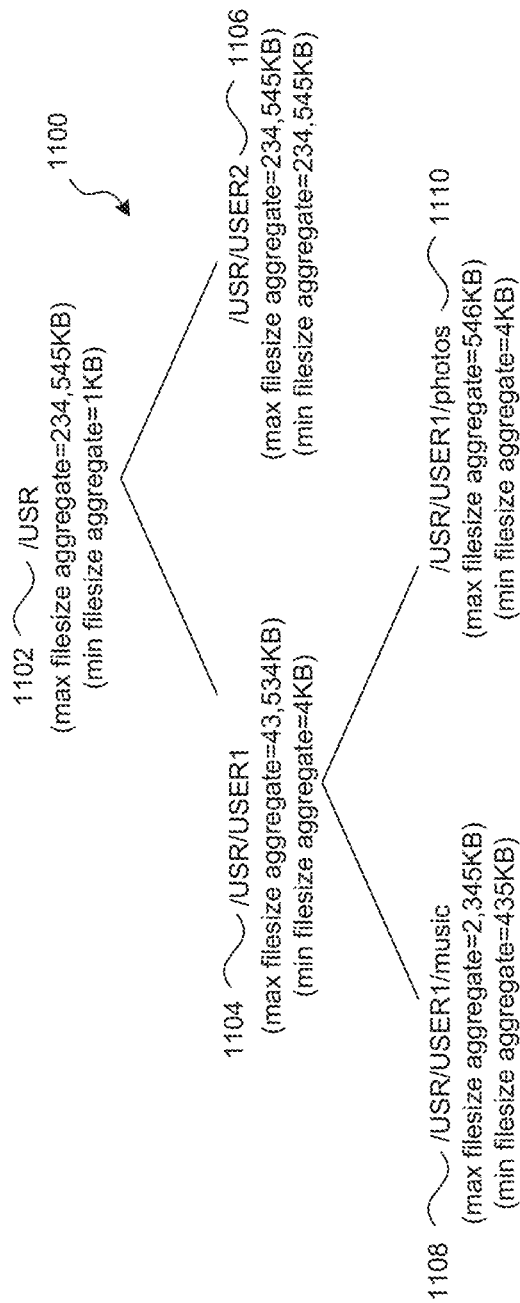
FIG. 11A illustrates a filesystem subtree 1100 illustrating max/min aggregates in accordance with embodiments of the facility.
FIG. 11B is a table that includes a sample of files within the folders representing in subtree 1100 and their corresponding filesizes and time-weighted sizes.

FIG. 11A illustrates a filesystem subtree 1100 illustrating max/min aggregates in accordance with embodiments of the facility. In this example, MAX and MIN filesize aggregates associated with files in the filesystem subtree 1100 are reflected. The shown subtree includes five folders 1102, 1104, 1106, 1108, and 1110. In an example, the facility aggregates the min and max filesizes for each folder by identifying, for each folder, the largest and smallest files in that folder (and its subfolders). In this example, the largest file in subfolder 1108 has a size of 2,345 KB and the smallest file in subfolder 1108 is 435 KB. The MAX/MIN aggregations enable efficient searching of files or folders. For example, if a user is searching for all files larger than 50,000 KB, the facility can skip searching files and folders within folder 904 because its aggregate max filesize is 43,534 KB. As another example, if the user is searching for all files between 2,000 KB and 20,000 KB, the facility can skip searching files and folders within folders 1108 and 1106 because its MIN filesize aggregate is greater than 20,000 KB. As other example, if the user is searching for the largest file in the subtree, the system need only search in folders 1102 and 1106, since they each have the same MAX filesize aggregate. In this manner, the facility improves the speed and efficiency with which a computing system can identify files relevant to a query, such as a user-generated search. In some embodiments, the facility stores, in association with each folder, a pointer to the file or files relevant to the aggregate values. For example, a pointer to /USR/USER2/file1 and a pointer to /USR/file1 may be stored in /USR because they are the largest and smallest files under /USR, respectively. Similarly, a pointer to /USR/USER1/file2 and a pointer to /USR/USER1/photos/file2 may be stored in /USR/USER1 because they are the largest and files under /USR/USER1, respectively. In some embodiments, a pointer to a file is stored in a data structure external to the folder storing the file.

Figure 12:
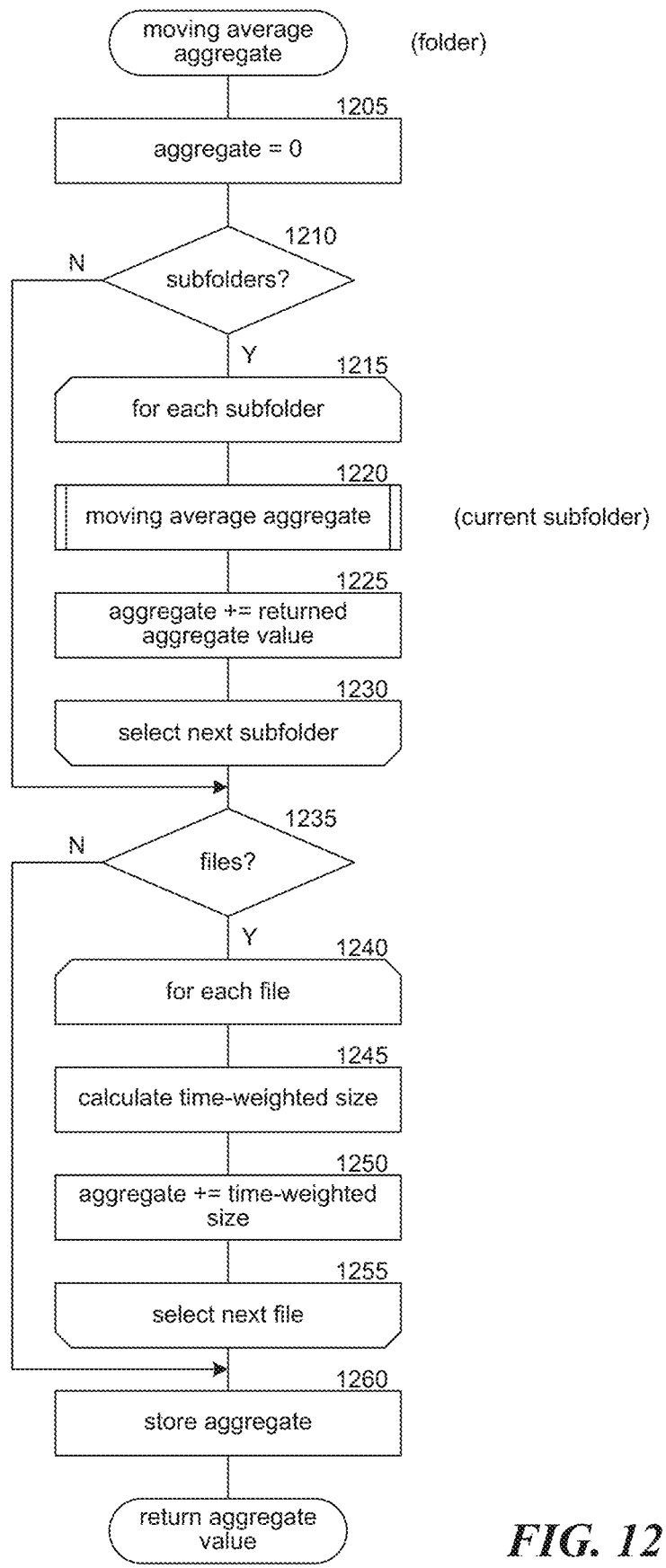
FIG. 12 is a flow diagram illustrating the processing of a moving average aggregate component in accordance with some embodiments of the facility.

FIG. 12 is a flow diagram illustrating the processing of a moving average aggregate component in accordance with some embodiments of the facility. The component is invoked to determine a moving average aggregate for a folder by recursively looping through each of its files and subfolders to determine moving averages for each and combining them into a moving average for the folder. A moving average is a "moving sum" having a particular unit (e.g., I/O operations, file reads, MB) divided by a time period to provide an average with respect to the unit (e.g., I/O operations per second, file reads per minute, 500 MB per hour). In block 1205, the component initializes an aggregate value to 0. In decision block 1210, if the folder contains any subfolders then the component continues at block 1215, else the component continues at decision block 1235. In blocks 1215 through 1230, the component selects each subfolder and calculates a corresponding moving average aggregate. In block 1220, the component recursively invokes the moving average aggregate component for the currently-selected subfolder. In block 1225, the component increases the aggregate value by the value returned by the moving average aggregate component for the currently-selected folder. In block 1230, the component selects the next subfolder and then loops back to block 1215. If all of the subfolders have already been selected then the component continues at decision block 1235. In decision block 1235, if the folder contains any files then the component continues at block 1240, else the component returns the aggregate value. In blocks 1240 through 1255, the component selects each file to calculate a corresponding moving average. In block 1245, the component calculates a time-weighted size for the currently-selected file based on the size of the file and the time at which the file was stored in the folder. For example, if the component is using the exponential decay function:

$$size_{tw} = size * e^{-t},$$

where $size_{tw}$ is the time-weighted size, size is the size of the file, and t is the difference between a base time (e.g., the current time or another time determined by the user, the system, etc.) and the time at which the file was stored in the folder. Although an exponential decay function is provided as an example herein, one of ordinary skill in the art will recognize that a variety of functions can be used, such as a linear decay function, a step or piecewise decay function, and so on. If the decay coefficient is based on a time window (e.g., $e^{-t/(time\ window)}$), then the decay approximates a moving sum for the entire window. For example, a sum of 120 units over a 60 minute moving window approximates one-minute moving average of 2 units per minute. In some embodiments, the component sets the time-weighted size to 0 if the calculated value is below a predetermined threshold (e.g., 0.05 bytes, 1 KB, 1 MB). In block 1250, the component increases the aggregate value by the calculated time-weighted size for the currently-selected file. In block 1255, the component selects the next file and then loops back to block 1240. If all of the files have already been selected then the component continues at block 1260. In block 1260, the component stores the aggregate value generated for the folder and then returns the aggregate value. While the above process is described in the context of a filesystem subtree (e.g., directory structure), one of ordinary skill in the art will recognize that this process can be applied to a variety of hierarchical structures, such as a b-tree, b+ tree, b*-tree, binary tree, and so on. In some embodiments, a means for generating a moving average aggregate for an attribute comprises one or more computers or processors configured to carry out the algorithm disclosed in FIG. 12 and this paragraph.

FIG. 11B is a table that includes a sample of files within the folders representing in subtree 1100 and their corresponding filesizes and time-weighted sizes. For example, file /USR/file2 is 32 KB while file /USR/USER1/photos/file1 is 546 KB. In this example, the mtimes associated with each file (see FIG. 9B) correspond to the time at which each file was added to its respective folder. In other words, the files have not been modified since they were created. Furthermore, the facility has employed a decay function producing a half-life of approximately 24 hours and uses the creation time of /USR/USER2/file1 as the base time. Thus, the time-weighted size of /USR/USER2/file1 is the same as its actual size; the time-weighted size of /USR/USER1/file1 is 7.5 KB, which is a quarter of its actual size because it was created 48 hours before /USR/USER2/file1; and the time-weighted sizes of each of the other files is 0 because they were created more than two years before /USR/USER2/file1 and the decay function results in a number smaller than a predetermined threshold (e.g., 1 byte).

Figure 11C:
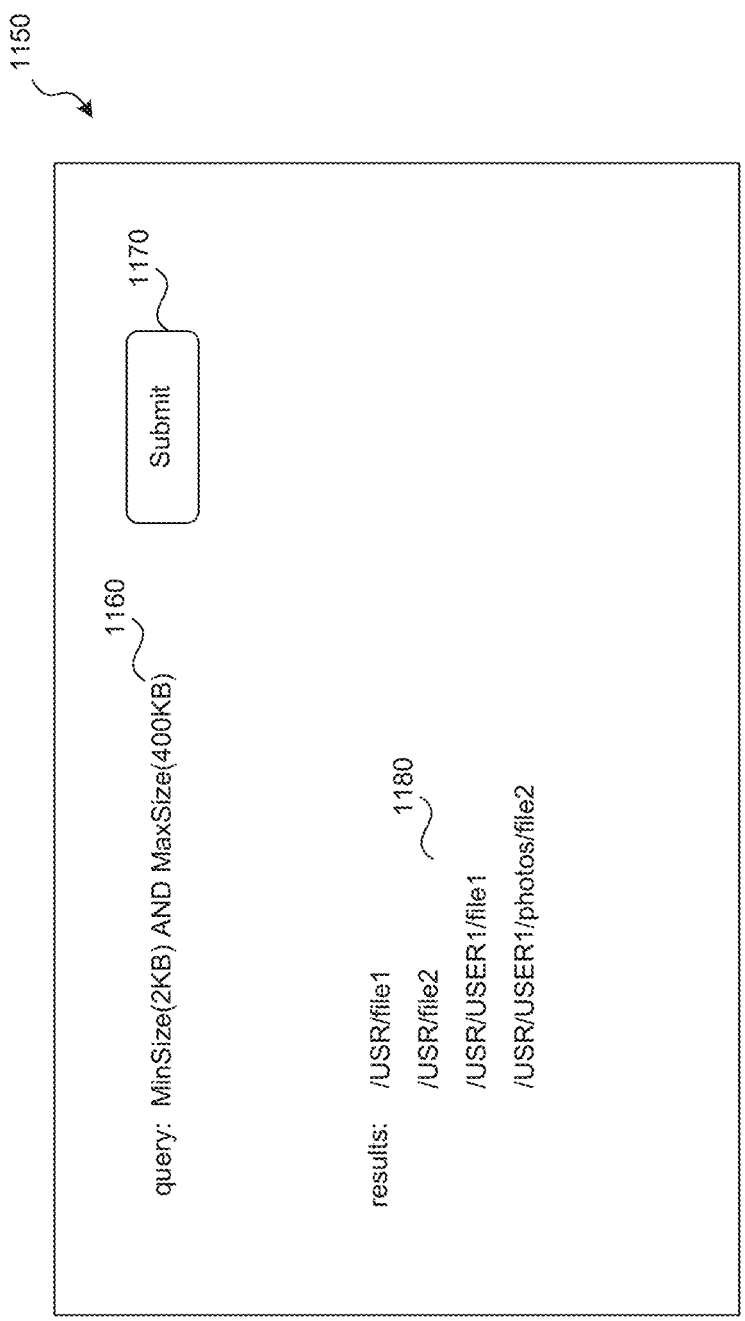
FIG. 11C is a display page illustrating query results generated in response to a query for files satisfying a specified filesize range.

FIG. 11C is a display page 1150 illustrating query results generated in response to a query against subtree 1100 for files satisfying a specified filesize range. In this example, a user has entered a query string 1160 specifying a filesize range of 2 KB and 400 KB using submit button 1170. In response to the query, the computing system traverses the subtree to identify files that satisfy the query based on the min and max filesize aggregates. For example, because the filesize aggregate range for folder 1102 (1 KB to 234,545 KB) includes values in the filesize range specified by the query, the computing system searches folder 1102 for files that satisfy the query. Similarly, because the filesize aggregate ranges for each of folder 1104 (4 KB to 43,534 KB) and folder 1110 (4 KB to 546 KB) include values in the filesize range specified by the query, the computing system searches folders 1104 and 1106 for files that satisfy the query. In contrast, because the filesize aggregate ranges for each of folder 1106 (234,545 KB to 234,545 KB) and folder 1108 (435 KB and 2,345 KB) do not include values in the filesize range specified by the query, the computing system can skip folders 1106 and 1108. Thus, the facility improves the rate at which a computing system searches for and identifies files relevant to a query.

Figure 13:
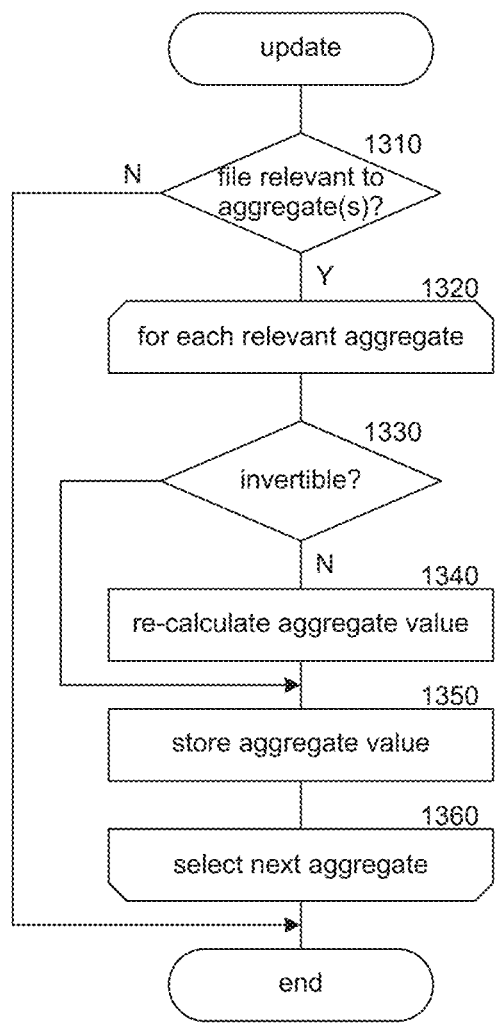
FIG. 13 is a flow diagram illustrating the processing of an update component in accordance with embodiments of the facility.

FIG. 13 is a flow diagram illustrating the processing of an update component in accordance with embodiments of the facility. The facility invokes the update component when there is a change to a hierarchical object, such as a file, folder, or tree node. For example, if a file is modified, added, deleted, or moved from a folder then the facility invokes the update component to update aggregate values. In block 1310, if the file has the potential to affect one or more of the aggregates currently maintained for the folder where the change the occurred (e.g., the folder storing an added or modified file, the folder from which a file was deleted), such as a checksum aggregate or an mtime aggregate for the folder that is the same as the mtime of the file, then the component continues at block 1320, else the component completes processing. As another example, if the mtime of the file is greater than the MAX mtime aggregate for the folder or less than the MIN mtime aggregate for the folder, the component facility invokes the update component. In blocks 1320 through 1360, the component loops through and updates each of the potentially affected aggregates. In decision block 1330, if the currently-selected aggregate is invertible then the component continues at block 1350, else the component continues at block 1340. In block 1340, the component re-calculates the aggregate value based on the change. For example, if a file having an mtime that is the same as the MAX mtime aggregate for the folder is deleted from the folder, then the component will search for a new file to use to update the MAX mtime aggregate based on the change. As another example, if a file is removed then a checksum aggregate can be re-calculated based on the change. In block 1350, the component stores the re-calculated aggregate value for the currently-selected aggregate for the folder and its ancestor folders. In some embodiments, a node in a filesystem tree has multiple parents, such as multiple directories or nodes containing hard links to the same file. In this case, the facility selects a "canonical" parent for the node and treats the other parents as "non-canonical" parents. Selection of the canonical parent is based on an immutable and comparable attribute of nodes, e.g. a numeric inode identifier, the order in which nodes were designated as a parent, and so on. Aggregates related to the node with multiple parents are computed as though the node is a child of the canonical parent while aggregates for the non-canonical parents are computed as if the node is not one of its children. In this manner, the node is not overrepresented in the aggregates of its parents. If the canonical parent of a node changes (e.g., due to unlinking from the current canonical parent, or linking into a new parent which becomes the canonical parent based on the selection method), the facility reconciles aggregates for the node as if it were a delete from the old canonical parent and an add to the new canonical parent. In block 1360, the component selects the next aggregate and then loops back to block 1320. If all of the aggregates have already been selected then processing of the component completes. While the above process is described in the context of a filesystem subtree (e.g., directory structure), one of ordinary skill in the art will recognize that this process can be applied to a variety of hierarchical structures, such as a b-tree, b+ tree, b*-tree, binary tree, and so on. In some embodiments, a means for updating aggregates comprises one or more computers or processors configured to carry out the algorithm disclosed in FIG. 13 and this paragraph.

FIG. 14 is an example screenshot of graphical user interface displayed on a client device, such a computing device. The user may elect to view various analytics 1402 regarding the filesystem, such as a particular filesystem tree structure. For example, the user may select a particular directory, e.g., root directory "/", for which to view those analytics. In response, the facility returns the one or more metric values along with a graphical representation of those metric values corresponding to a pathname 1404 indicating the selected directory. The metric values include storage data for the indicated root directory "/", such as an overall size (277.5 gigabytes) 1406 of the directory 1404, including a percentage (99.7%) of available storage capacity used by that directory, and a percentage (5.69%) of overall storage capacity used by that directory in the facility. The metric values include a recent access (raccess) date 1410 on which any file in the directory was last modified and a creation date 1408 on which the directory was created. Additionally, the metric values indicate an aggregate number (8288) of directories 1412 in the directory 1404 and an aggregate number (56877) of files 1414 in that directory.

In some embodiments, the graphical user interface indicates metric values for operations performed in a directory or its subtree. For example, a listing of the top I/Os per second ("IOPS") activity 1416 (e.g., read operations and write operations) among subdirectories of the selected directory 1404 is displayed. In some embodiments, the facility maintains and provides values for other metrics, such as metrics related to capacity or diskspace usage, processor usage or availability, throughput (e.g., bytes per second, megabytes per minute), file usage (or non-usage), and so on. Each of these directory entries includes the path of the file at which the I/O is performed along with the number of I/O operations performed per second with respect to that file. A user can select parameters for returning the IOPS activity as well. For example, in some embodiments, the user can elect to view any IOPS namespace activity 1420 related to reads and/or writes to namespaces or directories (e.g., changes to directory information or directory metadata) in the selected directory. In other embodiments, the user may elect to view IOPS file activity 1422 related to files contained in the directories of the root directory (e.g., changes to file contents or file metadata).

In some embodiments, the facility generates the graphical user interface based on data collected by periodically or probabilistically sampling activity within the system according to a sampling rate or sampling frequency (e.g., read operations, write operations, diskspace usage or availability, processor usage or availability, throughput, and so on) or retrieves metadata for directories or files. For example, in various embodiments the facility samples and records I/O operations according to a sampling rate of once per second or once per millisecond. In some embodiments, the facility employs a dynamic sampling rate that changes over time based on, for example, the rate at which activities are performed or the rate at which an activity data structure for recording the samples fills up. In some embodiments the facility samples and records every other I/O operation or every fifth I/O operation. In various embodiments, the facility maintains information about the sampled I/O operations in a data structure used by the facility to generate the graphical user interface. In various embodiments, the data structure includes, for example, the time of the I/O operation, the type of the I/O operation, a path associated with the I/O operation, the user and/or process that caused the I/O operation, the size of the I/O operation, and so on. The facility is configured to discard or delete operations from the data structure based on the total number of operations stored in the data structure or the age of the operations. For example, the facility may set a maximum threshold number of operations (e.g., 200, 5000, 90,000, 100,000) and discard the oldest entries once the maximum threshold number is met. As another example, the facility may discard any operations that occurred outside of (earlier than) a specified time window, such as a day, a week, a month, and so on. In some cases, the facility uses a combination of time and total number of operations. In some embodiments, the facility uses folder metadata (e.g., aggregate metrics) as an alternative to, or in addition to, the sampled data. Although the above examples have been described in the context of I/O operations, one of ordinary skill in the art will recognized that other metric values can be maintained and recorded through sampling and other means described herein.

The graphical representation of the metric values can include the directories of first-level (e.g., rank 1) that are children of the root directory "/", represented by the columns 1418 of the graphic. The height (y-axis) 1424, 1426, 1428, and 1430, of each directory rectangle reflects the aggregate number of files or storage capacity used by that directory in relation to its parent directory. Accordingly, some of the smaller-size directories may not be visible in the graphical representation of the root directory shown in FIG. 14.

Figure 15A:
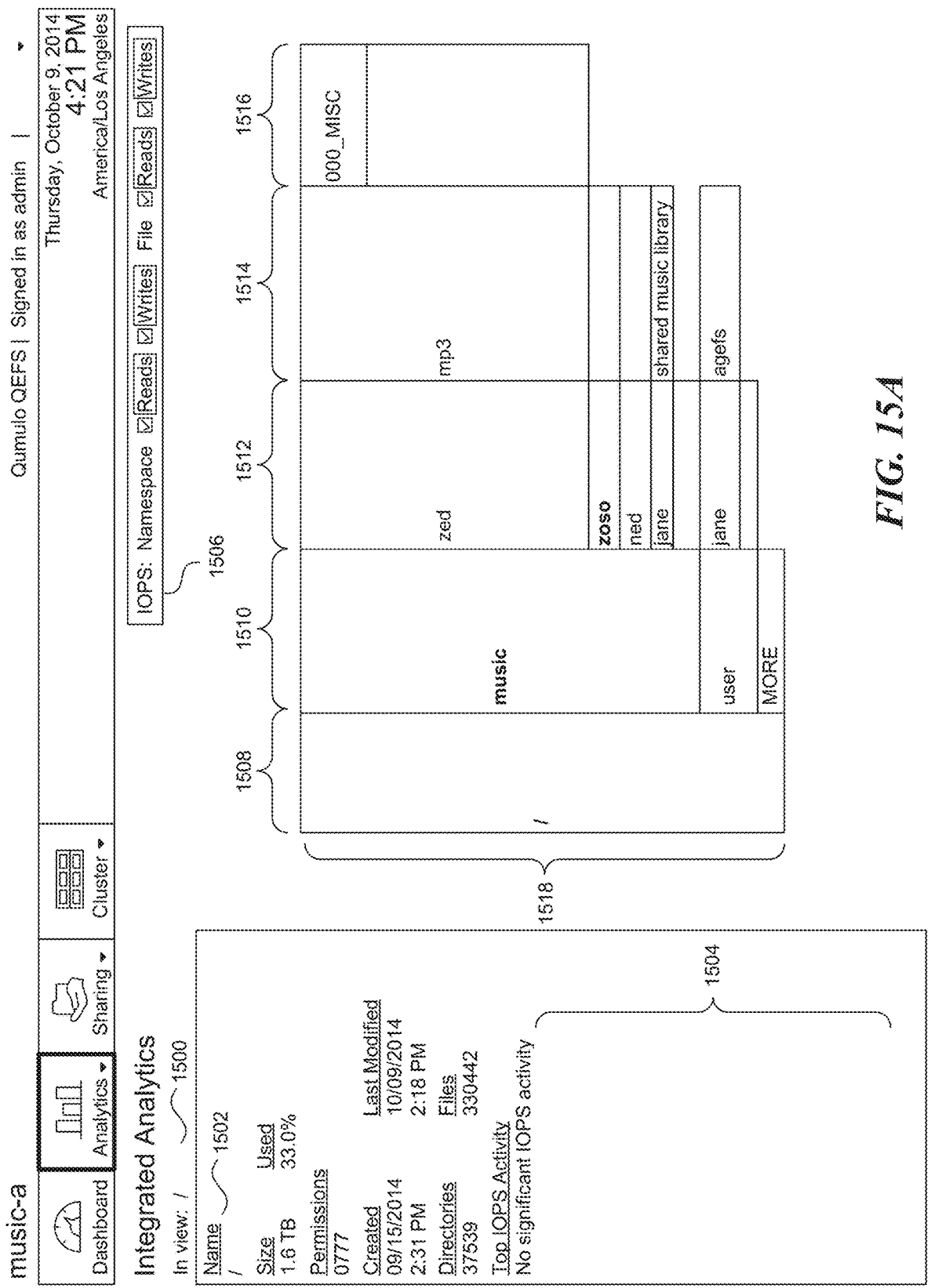
Figure 15B:
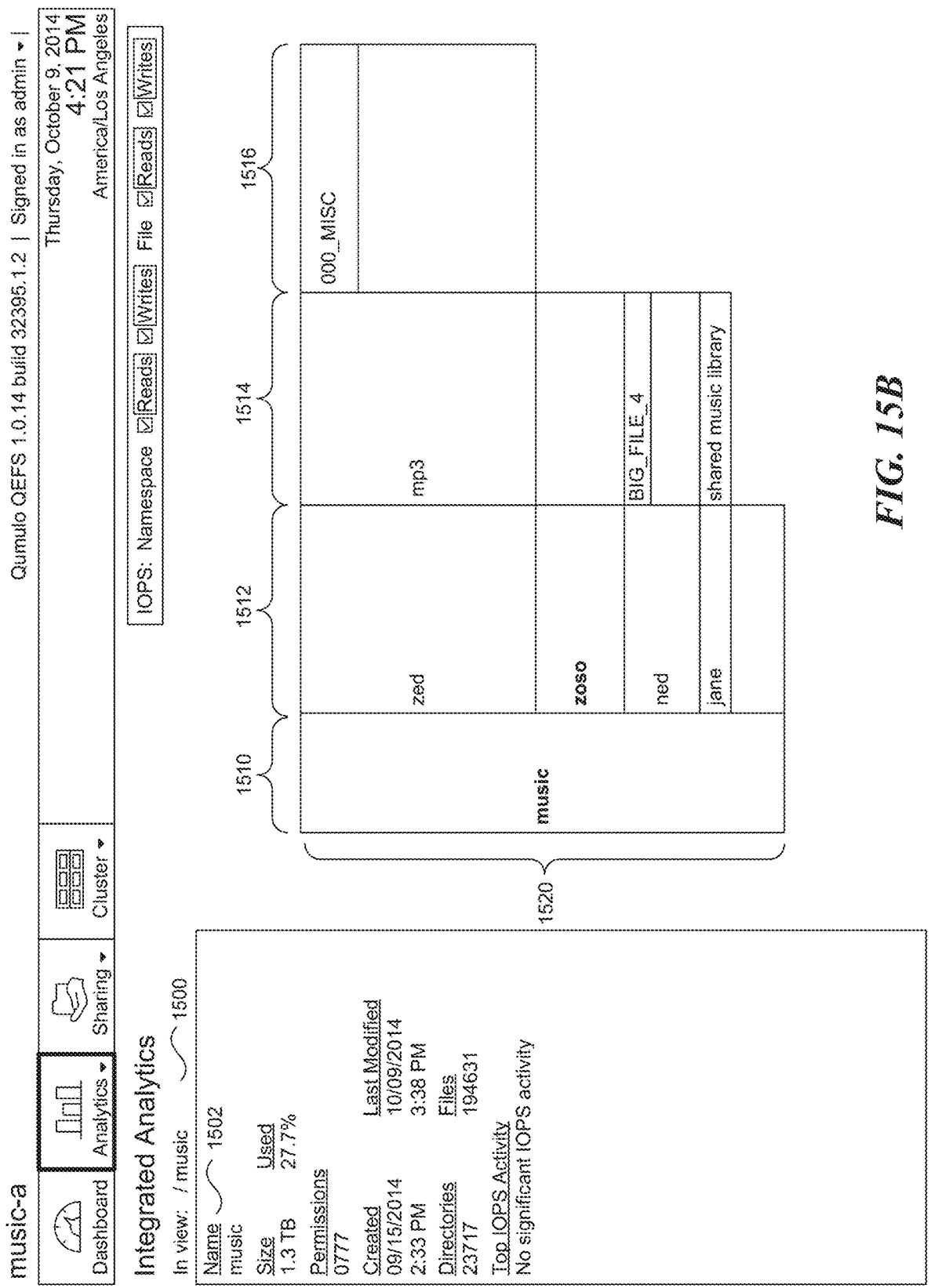
Figure 15C:
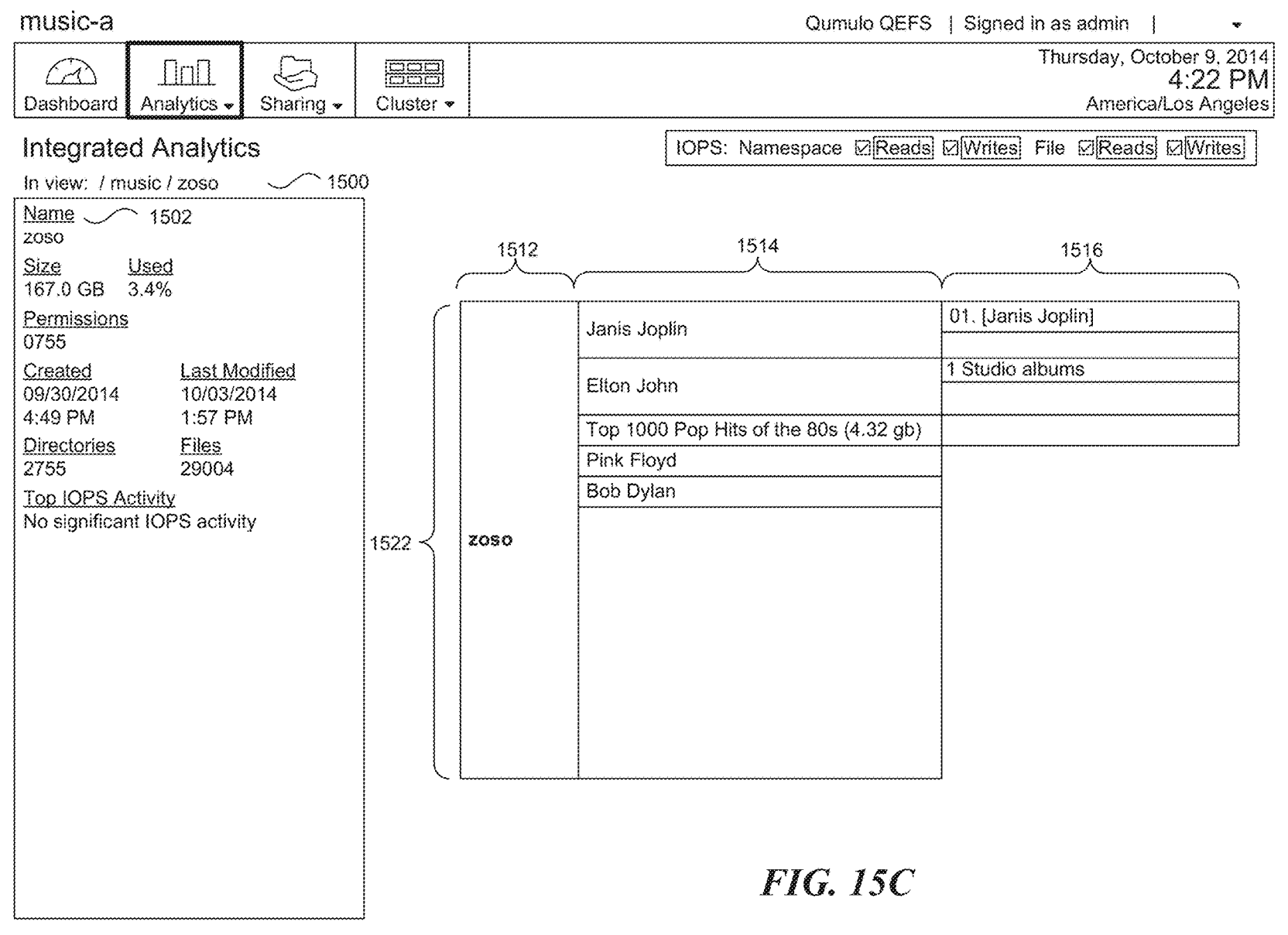

FIGS. 15A-15C are example screenshots of a graphical user interface displaying on a client device metrics for various directories in a filesystem tree. In FIG. 15A, a root directory is shown to be selected at the corresponding path 1500 in the filesystem, which is further indicated by the pathname "/" 1502 proximate to a plurality of analytics relating to that directory. Within the selected directory, there has been no recent activity. Accordingly, though each operation performed on the directory 1506 is selected for display, the IOPS activity 1504 in the cumulative analytics is empty. The size of the selected directory is graphically represented by the height of the column indicating that directory. In particular, column 1508 indicates directory "/" and its height 1518 corresponds to the size of the root directory (1.6 TB). The size of each of the three directories within the root directory (/music, /user, /MORE) is further indicated by the height of each of those child directories in relation to the root directory. So, based on the visual representation, the /music directory in column 1510 is clearly the largest, with the /user directory consuming more than the /MORE directory. To determine the exact size of a directory visible within the graphical representation, such as the "music" directory, the user simply selects that directory in the graphical representation.

FIG. 15B shows an example screenshot of the graphical user interface displaying analytics for the "music" directory after selection of that directory in FIG. 15A. As shown, the directory path 1500 now indicates the path "/music" for the /music directory. Additionally, the pathname 1502 and corresponding analytics are also updated to reflect analytics specific to that selected directory. In the graphical representation, the /music directory column 1510 is the leftmost column and each of the directories in the music directory are further expanded and detailed in the graphical representation. The height 1520 of the /music directory column 1510 now corresponds to 1.3 TB as indicated in the analytics for that directory. To determine the metrics of any child (or descendent) directory contained by the /music directory, the user can then select a displayed directory in the graphical representation. For example, the user can select the /music/zoso directory in column 1512, which shows the child directories for the /music directory.

FIG. 15C shows an example screenshot of the graphical user interface displaying analytics for the /music/zoso directory after selection of that directory in FIG. 15B. After selection of the /music/zoso directory, the path 1500 is updated to show the path for that directory "/music/zoso" and the path name 1502 is updated as well. The graphical representation is also updated to reflect the /music/zoso directory at the leftmost column 1512 and the corresponding directories (or files) contained by the /music/zoso directory. As with the preceding FIGS. 15A-15B, the height 1522 of the /music/zoso directory corresponds to the size (167.0 GB) of the directory. Furthermore, the height of each directory in each child or descendant directory in relation to the parent directory corresponds to the size of that directory, By providing enhanced visibility into the attributes of a data storage filesystem aggregated and stored at different levels in the filesystem hierarchy may facilitate management of the filesystem. It may be desirable to acquire analytics on portions or the entirety of a data storage filesystem tree. Analytics may relate to system capacity such as space usage by subdirectories, file counts, what is the newest/oldest file in a directory/tree, what file is most/least accessed, a histogram of file sizes, a breakdown of characteristics by file type such as space usage, file count, and the like. Other analytics may relate to performance such as transfer rates, I/O operations such as total operations, timing of I/O operations, latency and the like. This information may be used by system administrators for purposes such as: allocation of most frequently accessed data to data storage devices having a fast response time; customized backups based on date of most recent modification or change; resource planning based on total block usage by filesystem; and the like.

Live metrics of aggregate file attributes are therefore stored by the facility in the inode of a directory in the filesystem tree structure. The metric values are live in the sense that they are updated with respect to received updates for any filesystem object within the tree structure. Though each metric value may not reflect the most recent update to a particular directory, those metric values are current, or relatively current. Accordingly, the requested metric values are returned with a very low degree of latency unlike external systems. In some embodiments, the metrics are gathered from a recent system snapshot, where snapshot frequency and resulting latency may be set by a system administrator.

In some embodiments, in addition to storing metrics in the inodes of directories that are aggregated from the filesystem objects of the subtree defined by each directory, the facility also stores metrics in the inodes of files that relate solely to each file. The file metrics are copies of the file's attributes. In some embodiments, files can be added to the set of filesystem objects to be updated, as discussed in FIGS. 7A-7D.

In various embodiments, this information may facilitate the understanding of additional filesystem characteristics that may not be embedded in metadata such as: what percent of space within the filesystem is consumed by particular types of file (e.g., music files), how many files are owned or controlled by, or were created by, a particular user, information relative to additional user specified attributes (e.g., client or patient names) which may be embedded into file name structure, tags in file header data and the like.

From the foregoing, it will be appreciated that specific embodiments of the invention have been described herein for purposes of illustration, but that various modifications may be made without deviating from the scope of the invention. For example, while various aspects of the facility are described with reference to filesystem subtrees (e.g., directory structures), one of ordinary skill in the art will recognize that this process can be applied to a variety of hierarchical structures, such as a b-tree, b+ tree, b*-tree, binary tree, and so on. Accordingly, the invention is not limited except as by the appended claims.

We claim:

1. A method for managing a file system for a data storage system over a network, wherein one or more processors execute instructions to perform actions, comprising:

determining a hierarchical tree for the file system that includes a plurality of nodes including a root node, wherein each node includes one or more attributes;

determining a canonical parent node for a child node having a plurality of parent nodes based on an immutable attribute and a comparable attribute of the child node, wherein the one or more attributes of one or more non-canonical parent nodes of the child node is arranged as though the child node is unrelated to the one or more non-canonical parent nodes;

determining a result of a change in the file system that affects one or more leaf nodes, one or more non-leaf nodes that are on a direct path between the root node and the one or more leaf nodes, and one or more metrics that include each aggregated summary of one or more attributes of each node affected by the change, wherein each aggregated summary for the one or more attributes is stored in one or more keys of a binary tree data structure that are included at each level of the file system, and wherein the one or more metrics include another aggregated summary that represents a total number of files stored at each directory summed with each total number of files stored at each corresponding descendant directory in the binary tree data structure, and wherein efficiency is improved for computational resources employed to respond to a request for summarization of attributes of each node on the direct path and latency is reduced by employing one of more of the binary tree data structure keys to avoid traversal of each level of the file system on the direct path and scale the use of aggregated summaries for large directories of the file system;

determining one or more updates to the one or more metrics based on the result of the change to the file system;

providing a list of each node that has an unreconciled aggregated summary of one or more attributes related to the child node, wherein each aggregated summary for each node on the list is reconciled in its relation to the child node in one or more subsequent input/output operations to prevent over representation of the child node in each aggregated summary for each listed non-parent node;

in response to determining the one or more updates, updating the one or more metrics based on each metric associated with one or more child nodes, canonical parent nodes, and non-canonical parent nodes of the one or more non-leaf nodes on the direct path; and employing a fair sampling of the one or more metrics to provide a weight for each directory of the file system to determine a likelihood that each sample of a file system object is taken from each directory in the binary tree data structure, and wherein the weight is based on each other aggregated summary for each directory and employed to determine a sampling frequency for each directory and one or more attributes of the file system object, and wherein an overall number of samples taken is based on a confidence level for a result of the fair sampling.

2. The method of claim 1, wherein the one or more metrics include a checksum aggregate, and wherein updating the checksum aggregate of a first non-leaf node comprises calculating a checksum aggregate based on a currently stored checksum aggregate for the first non-leaf node and a checksum aggregate calculated for the leaf node.

3. The method of claim 1, wherein the change further comprises:
adding a new leaf node to the hierarchical tree for the file system, wherein the new leaf node includes one or more metrics that comprise at least a maximum aggregate value for a first attribute.

4. The method of claim 1, wherein the updating further comprises:
comparing a first non-leaf node's maximum aggregate attribute value to a new leaf node's maximum aggregate attribute value, wherein the values respectively correspond to the one or more metrics of the first non-leaf node and the one or more metrics of the new leaf node; and
in response to determining that the first non-leaf's maximum aggregate attribute value is less than the first new leaf node's maximum aggregate attribute value, replacing the first non-leaf node's maximum aggregate attribute value with the first new leaf's maximum aggregate attribute value.

5. The method of claim 1, wherein the updating further comprises:
comparing a first non-leaf node's minimum aggregate attribute value to a new leaf node's minimum aggregate attribute value, wherein the values respectively correspond to the one or more metrics of the first non-leaf node and the one or more metrics of the new leaf node; and
in response to determining that the first non-leaf's minimum aggregate attribute value is greater than the first new leaf node's minimum aggregate attribute value, replacing the first non-leaf node's minimum aggregate attribute value with the first new leafs minimum aggregate attribute value.

6. The method of claim 1, wherein the updating comprises:
adding a new leaf node to the hierarchical tree of the file system, wherein an attribute of the new leaf node includes a sameness bit;
comparing the new leaf node's sameness bit to other sameness bits that respectively correspond to one or more other leaf nodes and other non-leaf nodes, wherein the comparison is employed to set a value for a sameness bit for one or more ancestor non-leaf nodes of the other leaf nodes and other non-leaf nodes.

7. The method of claim 1, wherein the one or more attributes are associated with one or more of a high bound value or a low bound value for both of a maximum aggregate attribute value and a minimum aggregate value, wherein the lower bound value and higher bound value are employed to redirect or continue a search for a data object in one or more branches of the hierarchical tree in the file system.

8. A system for managing a file system for a data storage system over a network, comprising:
a server computer, including:
a transceiver for communicating over the network with the file system;
memory for storing instructions;
one or more processors that execute the instructions to perform a method comprising:
determining a hierarchical tree for the file system that includes a plurality of nodes including a root node, wherein each node includes one or more attributes;
determining a canonical parent node for a child node having a plurality of parent nodes based an immutable attribute and a comparable attribute of the child node, wherein the one or more attributes of one or more non-canonical parent nodes of the child node is arranged as though the child node is unrelated to the one or more non-canonical parent nodes;
determining a result of a change in the file system that affects one or more leaf nodes, one or more non-leaf nodes that are on a direct path between the root node and the one or more leaf nodes, and one or more metrics that include each aggregated summary of one or more attributes of each node affected by the change, wherein each aggregated summary for the one or more attributes is stored in one or more keys of a binary tree data structure that are included at each level of the file system, and wherein the one or more metrics include another aggregated summary that represents a total number of files stored at each directory summed with each total number of files stored at each corresponding descendant directory in the binary tree data structure, and wherein efficiency is improved for computational resources employed to respond to a request for summarization of attributes of each node on the direct path and latency is reduced by employing one of more of the binary tree data structure keys to avoid traversal of each level of the file system on the direct path and scale the use of aggregated summaries for large directories of the file system;
determining one or more updates to the one or more metrics based on the result of the change to the file system;
providing a list of each node that has an unreconciled aggregated summary of one or more attributes related to the child node, wherein each aggregated summary for each node on the list is reconciled in its relation to the child node in one or more subsequent input/output operations to prevent over representation of the child node in each aggregated summary for each listed non-parent node;
in response to determining the one or more updates, updating the one or more metrics based on each metric associated with one or more child nodes, canonical parent nodes, and non-canonical parent nodes of the one or more non-leaf nodes on the direct path; and
employing a fair sampling of the one or more metrics to provide a weight for each directory of the file system to determine a likelihood that each sample of a file system object is taken from each directory in the binary tree data structure, and wherein the weight is based on each other aggregated summary for each directory and employed to determine a sampling frequency for each directory and one or more attributes of the file system object, and wherein an overall number of samples taken is based on a confidence level for a result of the fair sampling; and a client computer, including:
  memory for storing instructions; and
  one or more processors that execute the instructions to perform a method comprising:
    providing a search query for a data object in one or more branches of the hierarchical tree in the file system.

9. The system of claim 8, wherein the one or more metrics include a checksum aggregate, and wherein updating the checksum aggregate of a first non-leaf node comprises calculating a checksum aggregate based on a currently stored checksum aggregate for the first non-leaf node and a checksum aggregate calculated for the leaf node.

10. The system of claim 8, wherein the change further comprises:
  adding a new leaf node to the hierarchical tree for the file system, wherein the new leaf node includes one or more metrics that comprise at least a maximum aggregate value for a first attribute.

11. The system of claim 8, wherein the updating further comprises:
  comparing a first non-leaf node's maximum aggregate attribute value to a new leaf node's maximum aggregate attribute value, wherein the values respectively correspond to the one or more metrics of the first non-leaf node and the one or more metrics of the new leaf node; and
  in response to determining that the first non-leaf's maximum aggregate attribute value is less than the first new leaf node's maximum aggregate attribute value, replacing the first non-leaf node's maximum aggregate attribute value with the first new leaf's maximum aggregate attribute value.

12. The system of claim 8, wherein the updating further comprises:
  comparing a first non-leaf node's minimum aggregate attribute value to a new leaf node's minimum aggregate attribute value, wherein the values respectively correspond to the one or more metrics of the first non-leaf node and the one or more metrics of the new leaf node; and
  in response to determining that the first non-leaf's minimum aggregate attribute value is greater than the first new leaf node's minimum aggregate attribute value, replacing the first non-leaf node's minimum aggregate attribute value with the first new leafs minimum aggregate attribute value.

13. The system of claim 8, wherein the updating comprises:
  adding a new leaf node to the hierarchical tree of the file system, wherein an attribute of the new leaf node includes a sameness bit;
  comparing the new leaf node's sameness bit to other sameness bits that respectively correspond to one or more other leaf nodes and other non-leaf nodes, wherein the comparison is employed to set a value for a sameness bit for one or more ancestor non-leaf nodes of the other leaf nodes and other non-leaf nodes.

14. The system of claim 8, wherein the one or more attributes are associated with one or more of a high bound value or a low bound value for both of a maximum aggregate attribute value and a minimum aggregate value, wherein the lower bound value and higher bound value are employed to redirect or continue the search for a data object in one or more branches of the hierarchical tree in the file system.

15. A computer readable non-transitory storage media that includes instructions for a method to manage a file system for a data storage system over a network, wherein one or more processors execute the instructions to perform the method comprising:
  determining a hierarchical tree for the file system that includes a plurality of nodes including a root node, wherein each node includes one or more attributes;
  determining a canonical parent node for a child node having a plurality of parent nodes based an immutable attribute and a comparable attribute of the child node, wherein the one or more attributes of one or more non-canonical parent nodes of the child node is arranged as though the child node is unrelated to the one or more non-canonical parent nodes;
  determining a result of a change in the file system that affects one or more leaf nodes, one or more non-leaf nodes that are on a direct path between the root node and the one or more leaf nodes, and one or more metrics that include each aggregated summary of one or more attributes of each node affected by the change, wherein each aggregated summary for the one or more attributes is stored in one or more keys of a binary tree data structure that are included at each level of the file system, and wherein the one or more metrics include another aggregated summary that represents a total number of files stored at each directory summed with each total number of files stored at each corresponding descendant directory in the binary tree data structure, and wherein efficiency is improved for computational resources employed to respond to a request for summarization of attributes of each node on the direct path and latency is reduced by employing one of more of the binary tree data structure keys to avoid traversal of each level of the file system on the direct path and scale the use of aggregated summaries for large directories of the file system;
  determining one or more updates to the one or more metrics based on the result of the change to the file system;
  providing a list of each node that has an unreconciled aggregated summary of one or more attributes related to the child node, wherein each aggregated summary for each node on the list is reconciled in its relation to the child node in one or more subsequent input/output operations to prevent over representation of the child node in each aggregated summary for each listed non-parent node;
  in response to determining the one or more updates, updating the one or more metrics based on each metric associated with one or more child nodes, canonical parent nodes, and noncanonical parent nodes of the one or more non-leaf nodes on the direct path; and
  employing a fair sampling of the one or more metrics to provide a weight for each directory of the file system to determine a likelihood that each sample of a file system object is taken from each directory in the binary tree data structure, and wherein the weight is based on each other aggregated summary for each directory and employed to determine a sampling frequency for each directory and one or more attributes of the file system object, and wherein an overall number of samples taken is based on a confidence level for a result of the fair sampling.

16. The media of claim 15, wherein the one or more metrics include a checksum aggregate, and wherein updating the checksum aggregate of a first non-leaf node comprises calculating a checksum aggregate based on a currently stored checksum aggregate for the first non-leaf node and a checksum aggregate calculated for the leaf node.

17. The media of claim 15, wherein the change further comprises:
   adding a new leaf node to the hierarchical tree for the file system, wherein the new leaf node includes one or more metrics that comprise at least a maximum aggregate value for a first attribute.

18. The media of claim 15, wherein the updating further comprises:
   comparing a first non-leaf node's maximum aggregate attribute value to a new leaf node's maximum aggregate attribute value, wherein the values respectively correspond to the one or more metrics of the first non-leaf node and the one or more metrics of the new leaf node; and
   in response to determining that the first non-leaf's maximum aggregate attribute value is less than the first new leaf node's maximum aggregate attribute value, replacing the first non-leaf node's maximum aggregate attribute value with the first new leaf's maximum aggregate attribute value.

19. The media of claim 15, wherein the updating further comprises:
   comparing a first non-leaf node's minimum aggregate attribute value to a new leaf node's minimum aggregate attribute value, wherein the values respectively correspond to the one or more metrics of the first non-leaf node and the one or more metrics of the new leaf node; and
   in response to determining that the first non-leaf's minimum aggregate attribute value is greater than the first new leaf node's minimum aggregate attribute value, replacing the first non-leaf node's minimum aggregate attribute value with the first new leafs minimum aggregate attribute value.

20. The media of claim 15, wherein the updating comprises:
   adding a new leaf node to the hierarchical tree of the file system, wherein an attribute of the new leaf node includes a sameness bit;
   comparing the new leaf node's sameness bit to other sameness bits that respectively correspond to one or more other leaf nodes and other non-leaf nodes, wherein the comparison is employed to set a value for a sameness bit for one or more ancestor non-leaf nodes of the other leaf nodes and other non-leaf nodes.

21. The media of claim 15, wherein the one or more attributes are associated with one or more of a high bound value or a low bound value for both of a maximum aggregate attribute value and a minimum aggregate value, wherein the lower bound value and higher bound value are employed to redirect or continue a search for a data object in one or more branches of the hierarchical tree in the file system.

* * * * *